United States Patent
Farhadiroushan et al.

(10) Patent No.: US 9,989,388 B2
(45) Date of Patent: Jun. 5, 2018

(54) OPTICAL FIBER CABLE

(71) Applicants: SILIXA LTD., Elstree, Hertfordshire (GB); Chevron U.S.A. Inc., San Ramon, CA (US)

(72) Inventors: Mahmoud Farhadiroushan, Elstree (GB); Daniel Finfer, Elstree (GB); Veronique Mahue, Elstree (GB); Tom Parker, Elstree (GB); Sergey Shatalin, Elstree (GB); Dmitry Strusevich, Elstree (GB)

(73) Assignees: Silixa Ltd., Elstree Hertfordshire (GB); Chevron U.S.A. Inc., San Ramon, CA (US)

( * ) Notice: Subject to any disclaimer, the term of this patent is extended or adjusted under 35 U.S.C. 154(b) by 0 days. days.

(21) Appl. No.: 15/029,480

(22) PCT Filed: Oct. 15, 2014

(86) PCT No.: PCT/GB2014/053100
§ 371 (c)(1),
(2) Date: Apr. 14, 2016

(87) PCT Pub. No.: WO2015/056012
PCT Pub. Date: Apr. 23, 2015

(65) Prior Publication Data
US 2016/0258795 A1 Sep. 8, 2016

(30) Foreign Application Priority Data
Oct. 15, 2013 (GB) .................................. 1318254.8

(51) Int. Cl.
*G02B 6/44* (2006.01)
*G01F 1/66* (2006.01)
*G01D 5/353* (2006.01)

(52) U.S. Cl.
CPC ........... *G01F 1/661* (2013.01); *G01D 5/3537* (2013.01); *G02B 6/4415* (2013.01)

(58) Field of Classification Search
CPC ...... G01D 5/3537; G01F 1/661; G02B 6/4415
See application file for complete search history.

(56) References Cited

U.S. PATENT DOCUMENTS

| 4,521,072 A | 6/1985 | Cholley |
| 4,524,436 A | 6/1985 | Hall |

(Continued)

FOREIGN PATENT DOCUMENTS

| CN | 201689198 U | 12/2010 |
| DE | 3632730 A1 | 4/1988 |

(Continued)

OTHER PUBLICATIONS

Intellectual Property Office, Patents Act 1977: Examination Report under Section 17(6) for GB Application No. 1606290.3, dated Feb. 22, 2017.

(Continued)

*Primary Examiner* — Akm Enayet Ullah
(74) *Attorney, Agent, or Firm* — Honigman Miller Schwartz and Cohn LLP; Matthew H. Szalach; Jonathan P. O'Brien

(57) ABSTRACT

Embodiments of the present invention provide a cable for optical fiber sensing applications formed from fiber wound around a cable core. A protective layer is then preferably placed over the top of the wound fiber, to protect the fiber, and to help keep it in place on the cable core. The cable core is preferably of a diameter to allow bend-insensitive fiber to be wound thereon with low bending losses. The effect of winding the fiber onto the cable core means that the longitudinal sensing resolution of the resulting cable is higher than simple straight fiber, when the cable is used with an (Continued)

optical fiber sensing system such as a DAS or DTS system. The achieved resolution for the resulting cable is a function of the fiber winding diameter and pitch, with a larger diameter and reduced winding pitch giving a higher longitudinal sensing resolution.

20 Claims, 21 Drawing Sheets

(56) References Cited

U.S. PATENT DOCUMENTS

| | | | | |
|---|---|---|---|---|
| 4,836,639 | A * | 6/1989 | Shamoto | G02B 6/4402 |
| | | | | 385/109 |
| 5,256,237 | A | 10/1993 | Maas et al. | |
| 6,211,964 | B1 * | 4/2001 | Luscombe | G01H 9/004 |
| | | | | 250/227.27 |
| 6,450,037 | B1 | 9/2002 | McGuinn et al. | |
| 7,412,118 | B1 | 8/2008 | Shaibani | |
| 8,493,555 | B2 * | 7/2013 | Li | G01L 1/246 |
| | | | | 356/73.1 |
| 8,723,825 | B2 * | 5/2014 | Wright | G06F 3/0416 |
| | | | | 345/156 |
| 8,948,550 | B2 * | 2/2015 | Li | G01K 11/32 |
| | | | | 385/12 |
| 9,429,480 | B2 * | 8/2016 | Smith | G01K 5/483 |
| 2001/0030076 | A1 | 10/2001 | Paulsson | |
| 2004/0184352 | A1 | 9/2004 | Woo | |
| 2006/0045408 | A1 | 3/2006 | Jones et al. | |
| 2006/0115335 | A1 | 6/2006 | Allen et al. | |
| 2006/0120675 | A1 | 6/2006 | Goldner | |
| 2008/0118209 | A1 | 5/2008 | Varkey et al. | |
| 2012/0227504 | A1 | 9/2012 | Goldner | |
| 2013/0094798 | A1 | 4/2013 | Duncan et al. | |

FOREIGN PATENT DOCUMENTS

| | | |
|---|---|---|
| EP | 2372423 A1 | 10/2011 |
| GB | 2147976 A | 5/1985 |
| GB | 2393749 A | 4/2004 |
| GB | 2393781 A1 | 4/2004 |
| GB | 2457277 A | 8/2009 |
| GB | 2496863 A | 5/2013 |
| GB | 2508314 A | 5/2014 |
| JP | 2001174341 A | 6/2001 |
| JP | 2008014641 A | 1/2008 |
| JP | 2013104700 A | 5/2013 |
| WO | WO-2004034096 | 4/2004 |
| WO | 2008108373 A1 | 9/2008 |
| WO | WO-2010136809 | 12/2010 |
| WO | WO-2010136810 | 12/2010 |
| WO | WO-2013090544 A1 | 6/2013 |
| WO | WO-2014064460 A1 | 5/2014 |

OTHER PUBLICATIONS

Intellectual Property Office, Patents Act 1977: Examination Report under Section 18(3) for GB Application No. 1606290.3, dated Jan. 26, 2017.
Intellectual Property Office, Patents Act 1977: Examination Report under Section 18(3) for GB Application No. 1606290.3, dated Jun. 29, 2017.
Intellectual Property Office, Search Report under Section 17 for Application No. GB1318254.8, dated Jun. 24, 2014.
International Searching Authority, International Search Report and Written Opinion for International Application No. PCT/GB2014/053100, dated Mar. 26, 2015.
Intellectual Property Office, Patents Act 1977: Combined Search and Examination Report under Sections 17 and 18(3) for GB Application No. 1720742.4, dated Jan. 19, 2018.

* cited by examiner

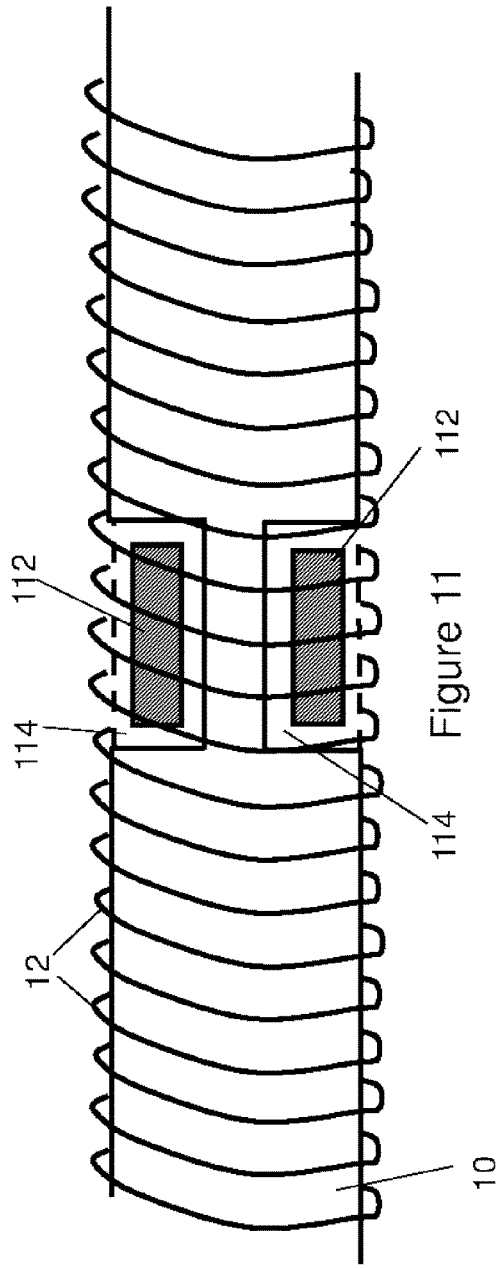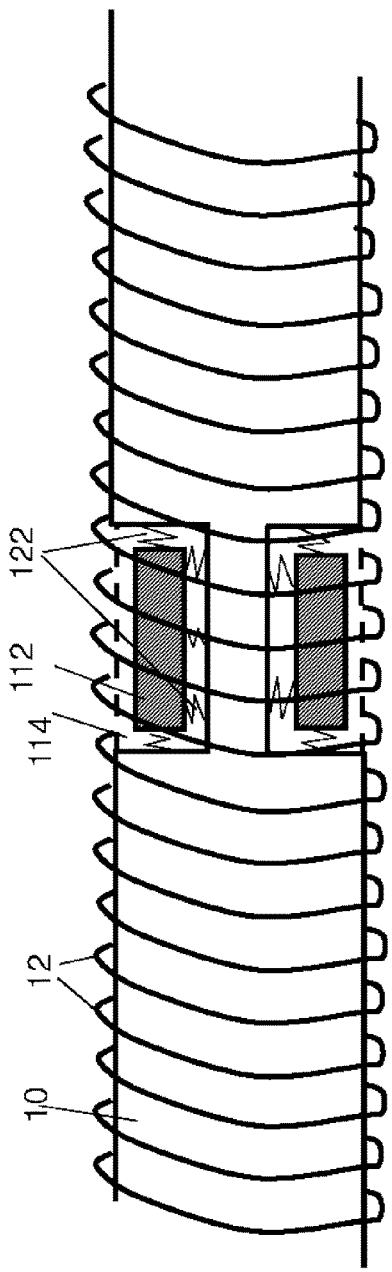

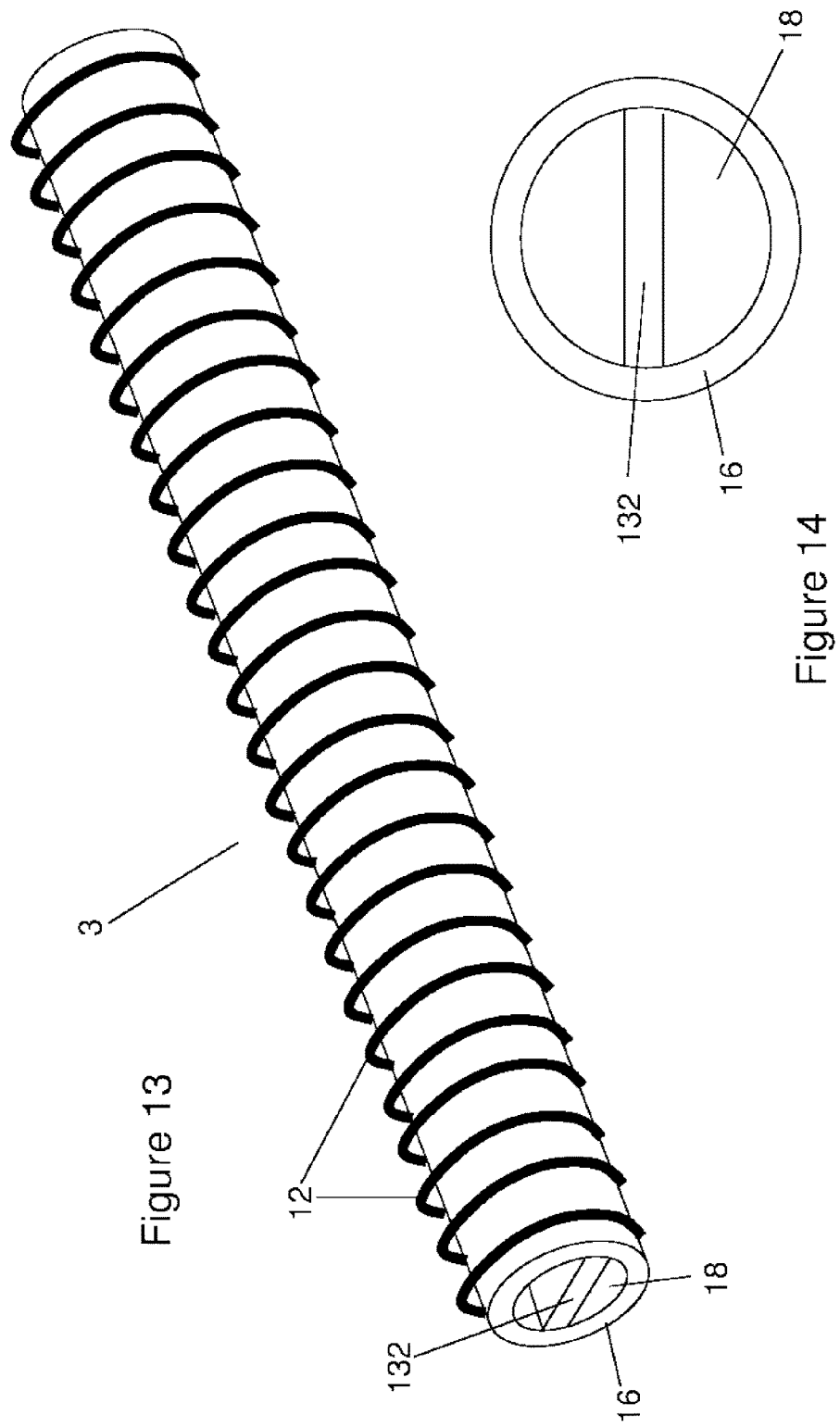

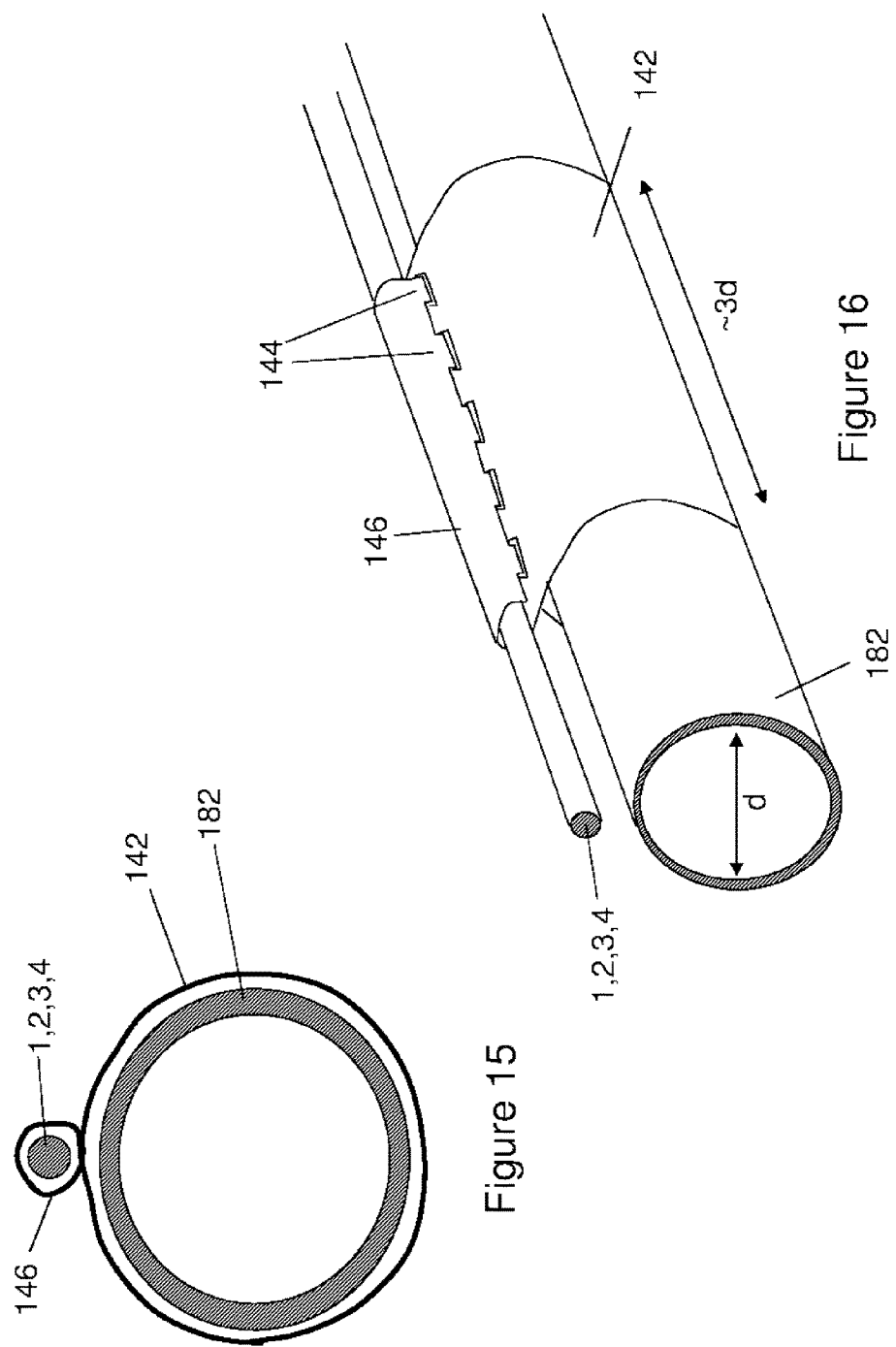

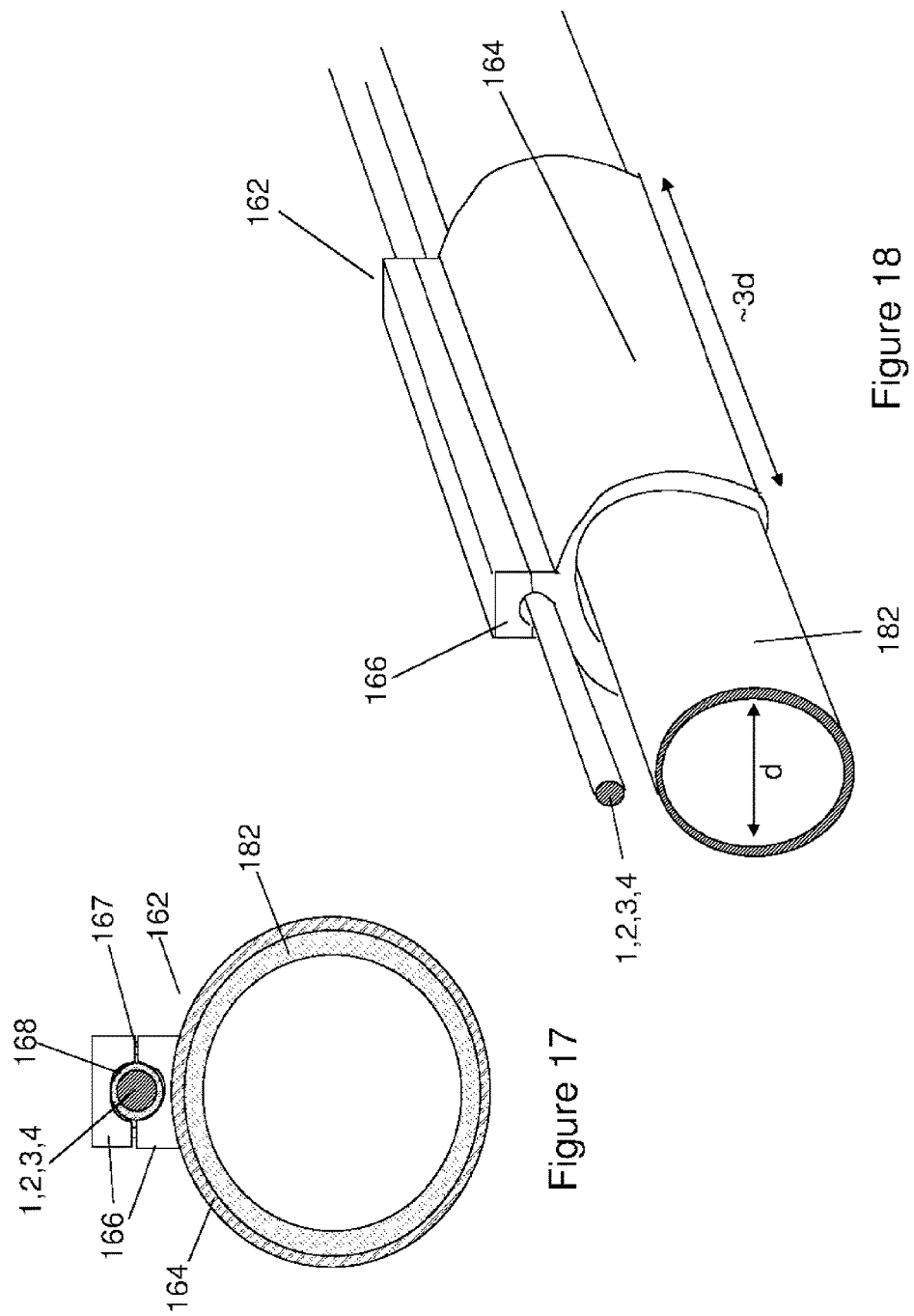

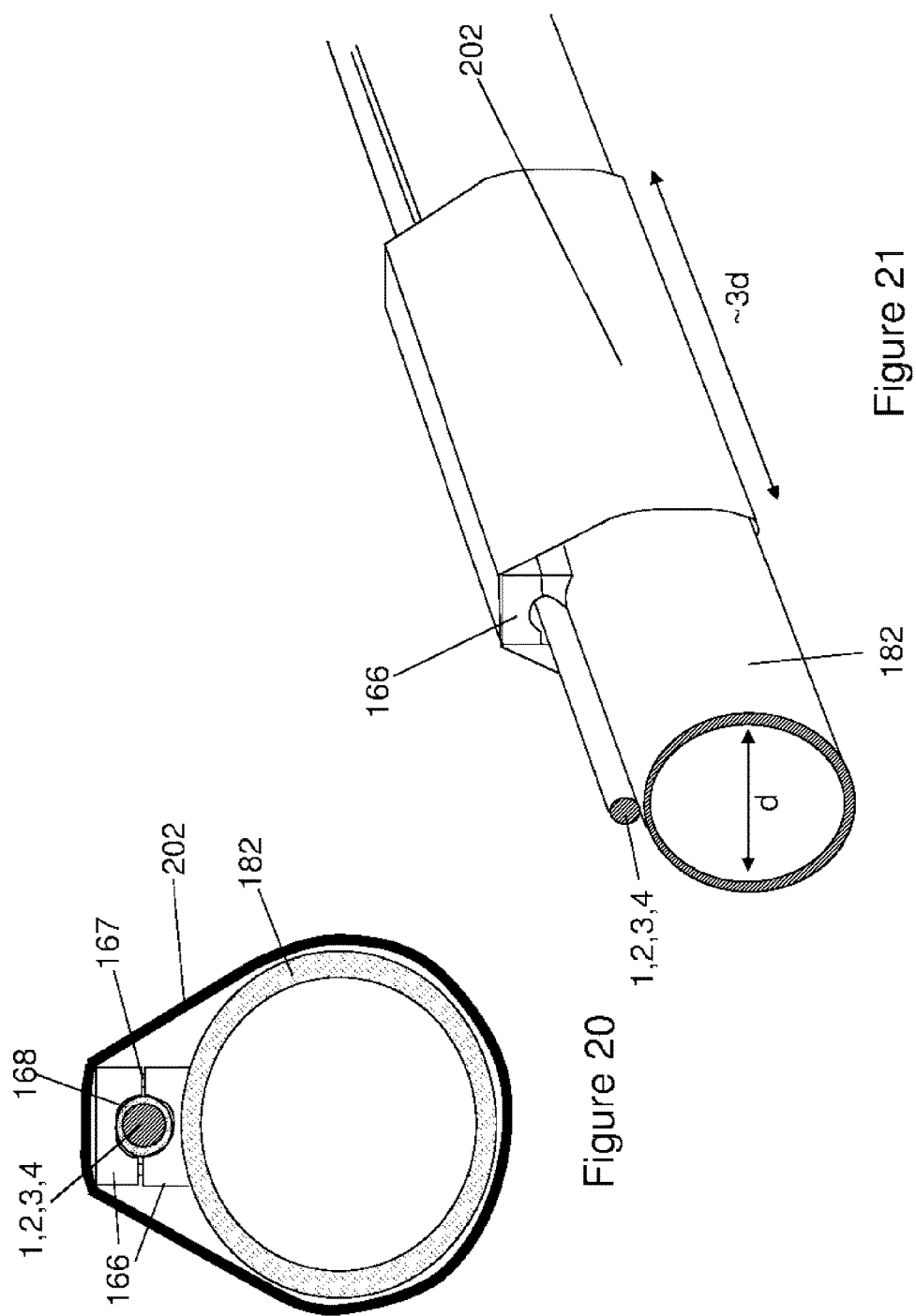

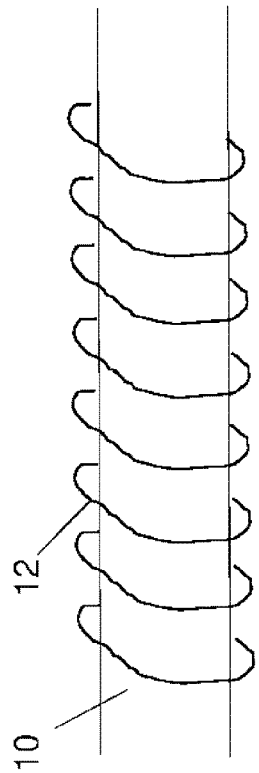
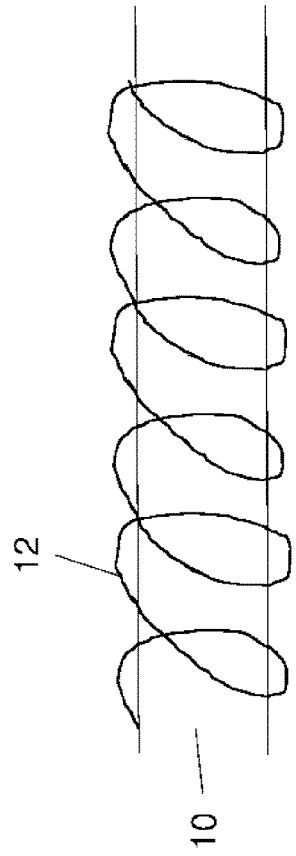
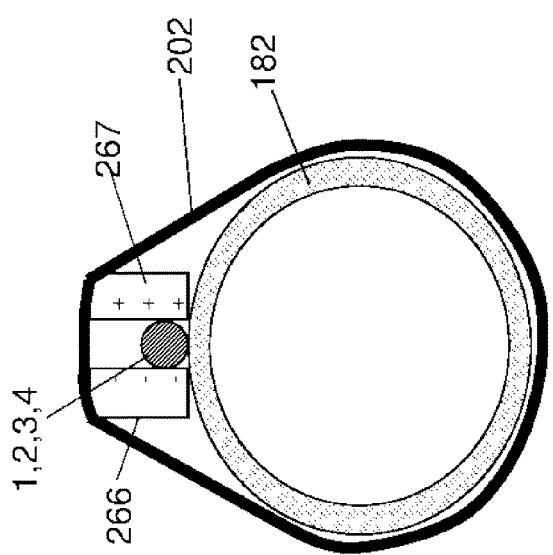
Figure 24
Figure 25
Figure 23

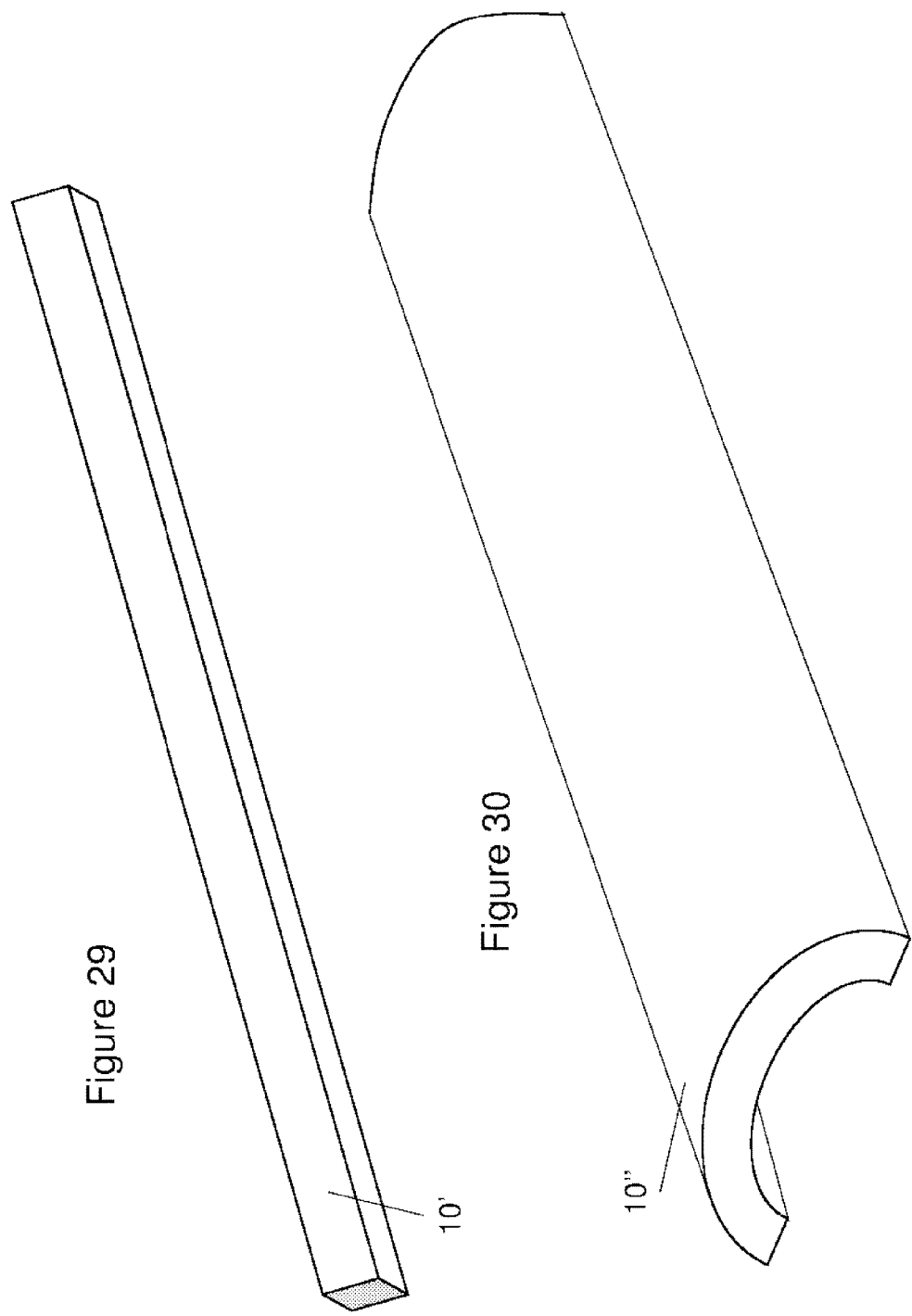

OPTICAL FIBER CABLE

CROSS-REFERENCE TO RELATED APPLICATIONS

This application claims priority under 35 U.S.C. § 371 to Patent Cooperation Treaty Application No. PCT/GB2014/053100, filed Oct. 15, 2014, which claims priority to GB Application No. 1318254.8, filed Oct. 15, 2013, the entire contents of which are incorporated herein by reference.

TECHNICAL FIELD

The present invention relates to a cable formed from wound optical fiber. The cable is particularly useful for optical fiber sensing purposes, for example with a distributed acoustic sensor (DAS) system, or distributed temperature sensor (DTS) systems. In particular the spatial sensing resolution of such a system will typically be increased by using such a cable. Furthermore the cable can be used for enhanced measurements such as distributed flow and seismic profiling.

BACKGROUND TO THE INVENTION AND PRIOR ART

Distributed acoustic sensor (DAS) systems and distributed temperature sensor (DTS) systems are known in the art. Both DAS and DTS systems are commercially available from the present applicant, amongst others, referred to as the Silixa iDAS system, and the Silixa Ultima DTS system. Further details of both systems were available before the priority date at http://www.silixa.com/technology/idas/, and http://www.silixa.com/technology/its/. In addition, further technical details of the operation of the Silixa iDAS system can be found in our earlier patent applications WO2010/136809 and WO2010/136810, any details of which that are necessary for understanding the present invention being incorporated herein by reference.

The acoustic sensing and the dynamic strain spatial resolution of the known Silixa iDAS system is of the order of 1 m-5 m, in that a separate acoustic signal can be resolved for every 1 m-5 m or so of fiber. Thus, such a DAS provides the equivalent sensing capacity as if an array of synchronised microphones were to be placed approximately at every 1 m-5 m intervals. Whilst presently providing class-leading performance that is suitable for many applications, in some potential applications it would be beneficial if even higher spatial resolution could be provided, for example of 5 cm to 50 cm, or even measured in mm.

One known technique for trying to improve the spatial sensing resolution is illustrated in FIG. 17 of WO2010/136810. Here, an optical fibre sensor is being used to monitor a pipeline, and the fibre is installed running along the pipe. In order to try and improve the spatial resolution of the sensor at certain points along the pipe, the fibre has in places been helically wrapped around the actual pipe to be monitored. The effect of this is that, because the DAS system can effectively resolve an individual acoustic sensing point say approximately every 5 m along the length of the fibre (although in some cases resolution can be as high as 1 m), because the fibre is wrapped around the pipe, the sensing resolution in the direction along the pipe is substantially increased, essentially by a factor dependent on the circumference of the pipe. For example, as a simple example, assume the circumference of the pipe was also 5 m, then there would be an effective acoustic sensor measurement taken for substantially every turn around the pipe. The longitudinal sensor resolution along the pipe is therefore increased to the pitch of the helical winding of the fiber around the pipe. As another example assume the circumference of the pipe is 10 cm and we wrapped the fibre sensor around the pipe multiple turns, then there would be an effective acoustic sensor measurement taken for substantially every 5 cm to 50 cm section of pipes. In addition, the acoustic and dynamic strain sensitivity of fibre is enhanced for flow and seismic measurements in the wrapped section.

Such a solution is acceptable in some scenarios, for example where a section of the fibre can be directly wrapped around a section of a pipe or flow lines. However, it is more desirable and in some scenarios, such as wellbore installations, for the fiber to be simply laid within or next to the object or area to be monitored. Moreover, physically winding the fiber around the object to be monitored may not be possible, or be prohibitively expensive.

In a related field, optical fiber technology has also advanced in recent years, and in particular in the field of bend-insensitive (BI) fibers. These are optical fibers that permit a high degree of bending, in some cases with a bend radius as low as 5 mm, without large optical power loss from the core. The ITU has issued a number of standards for BI fiber, and in particular the ITU-T G.657 family of standards. Of these, BI fiber compliant with ITU-T G.675.A.3 can tolerate a bend radius of down to 5 mm, with a loss of 0.15 dB/turn at such a radius. A larger radius typically significantly reduces the loss per turn. For example, for BI cable in accordance with the ITU-T G.675.A.2 standard (which permits a minimum bend radius of 7.5 mm), the loss for 10 turns at 1550 nm with 15 mm bend radius is only 0.03 dB, whereas for a 7.5 mm bend radius the loss for 1 turn is 0.5 dB. The performance of BI fiber is being improved constantly, with lower losses for smaller bend radii. Example commercially available BI fibers are the ClearCurve® family of fibers, available from Corning Incorporated, of Corning, N.Y.

Finally, US 2013/0094798 describes a fiber optic cable having an outer protective coating surrounding an optical fiber. The optical fiber itself is described as having a helical core, which includes a plurality of sensors typically equally spaced along the helical core.

SUMMARY OF THE INVENTION

Embodiments of the present invention provide a cable for optical fiber sensing applications formed from fiber wound around a cable core. Preferably the fiber is wound densely around the cable core. A protective layer is then preferably placed or extruded over the top of the wound fiber, to protect the fiber, and to help keep it in place on the cable core. The cable core is preferably of a diameter to allow bend-insensitive fiber to be wound thereon with low bending losses. For example the radius of the cable core is preferably larger than 5 mm, with radii of 7 to 12 mm providing good performance Whilst there is no real upper limit to the radius of the cable core (within reason), cable core diameters of several centimeters to several tens of centimeters might also be used in some applications. The effect of winding the fiber onto the cable core means that the longitudinal sensing resolution of the resulting cable is higher than simple straight fiber, when the cable is used with an optical fiber sensing system such as a DAS or DTS system. The achieved resolution for the resulting cable is a function of the fiber winding diameter and pitch, with a larger diameter and reduced winding pitch giving a higher longitudinal sensing resolution. In some embodiments, the fiber is helically wound around the cable core such that each winding is contiguous, in which case the pitch is essentially defined by the thickness of the fiber. This arrangement provides the highest longitudinal sensing resolution along the resulting cable, with the actual resolution then being determined by the native resolution of the DAS or DTS equipment, and the diameter of the fiber windings on the cable core.

The provision of a cable formed from wound fiber according to embodiments of the present invention provides significant advantages in terms of ease of use and installation as well as improved sensitivity. In particular, the cable can simply be treated as a coherent whole which can be installed very easily by simply immersing it inside a volume or laying it next to an object to be monitored (rather than having to wrap fiber around the whole object, as in the prior art). In addition, in area sensing applications, using a cable according to the present invention in place of a run of fiber provides for significantly increased sensing spatial resolution, in that more acoustic samples can be obtained per length of such a cable than for a corresponding length of fiber installed in the same position.

In some embodiments the helical pitch can be different at different points along the cable. This allows for different spatial resolution to be obtained at different points on the cable, dependent on the helical pitch. In addition, it may be that in some embodiments the fiber is not helically wound round the cable core at all points along the cable, but instead runs along the cable core parallel thereto between regions of helical windings. In so doing fiber bending losses are minimised in those regions where the fiber is not helically wound, and the total length of the cable can be increased. The regions of helical winding can thus be provided in those regions of the cable that when installed will be next to infrastructure to be monitored that requires higher spatial resolution, with other parts of the infrastructure that require lower spatial resolution monitoring being provided with regions of the cable with helical windings of larger pitch, or with straight sections of fiber, as appropriate. In this way, a bespoke sensing cable can be provided with its sensing spatial resolution adapted along its length for the specific installation in which it will be placed.

In some embodiments the cable core can be adapted so as to be directionally selective in its response to incident acoustic or vibration energy. For example, in one embodiment the cable core can be provided with cut-out portions in which blocks of different material having different acoustic characteristic can be inserted, so as to allow for directional sensitivity of the cable core response. In some embodiments the blocks may be resiliently mounted, for example with springs, or the like. In another embodiment where the cable core is provided with hollow sections, the core may be provided with ridged bridges, connecting one side of the cable hollow wall to the other wall. Such bridges again directionally modify the cable core response, so that the directional response of the whole cable is adapted.

Embodiments of the present invention also provide for specially designed clamps to secure the optical fiber cables to infrastructure to be monitored, and in particular pipework-type infrastructure such as oil well casing or tubing, by way of example. The clamps are designed to transfer acoustic strain vibrations from the pipework to be monitored to the optical fiber cable in a manner that allows the vibrations to be effectively transmitted to the cable. In one embodiment a Figure of 8 clamp arrangement is believed to be particularly effective at transmitting the acoustic strain vibrational energy from the infrastructure being monitored to the cable. For example, in this case, the tensional hoop strain from a pipework is translated to a compressional hoop strain around the optical fiber cable. In another embodiment a clamp arrangement is provided where magnets exert a lateral force on the cable so as to make the cable more sensitive to vibrations from a direction of incidence substantially orthogonal to the lateral force, the cable being placed against an article to be monitored so that the article contacts the cable in the orthogonal direction.

The shape of the cable core itself can be altered in embodiments of the invention. In particular, the cable core may be circular, but may be other shapes also, including any polygonal shape, or may be arc shaped, or horse-shoe shaped. In some embodiments the shape of the cable core may be adapted to the external surface against which the fiber cable is to be placed in use, such that the cable shape is complementary to the external surface shape. For example, the cable core may be shaped such that the cable is then contiguous against the article to be monitored. As a further example, where the cable is intended to be placed against pipework of circular cross-section, then the cable core may be arc-shaped, for example so as to contiguously fit against a segment of the outer surface of the pipe.

In some embodiments the shape of the cable core may change along the cable, such that the cable core shape is different at different parts of the cable. This feature allows completely bespoke cables to be designed specific to the application in question. For example, some parts of the cable may be arc shaped to allow the cable to be placed against a circular pipe, whereas other parts may be of different cross-section for example, circular.

Regarding the winding of the fiber around the core, the winding may be helically wound, or may be wound in other fashions that are not strictly helical windings. For example, where the fiber is wound at a high pitch angle, the fiber may "double back" as the winding transitions from one side of the cable core to the other. The net position from winding to winding is still, however, that the mean or median position of each winding is progressively further along the cable core than the previous winding. In other embodiments pseudo-cycloidal windings may be used, where the windings form a series of loops that progress along the cable core. Further example windings are shown in the drawings, and described further below.

As noted above, in embodiments of the invention the fiber optic cable is used with a distributed acoustic sensing system. In particular, we have found such a cable to be particularly effective at allowing a DAS system provided with such a cable to conduct flow monitoring of pipework. In particular, the higher spatial resolution obtained from the helical cable of the present invention allows for improved eddies detection and tracking in pipework, which in turn, by tracking the strain induced vibration by the eddies along the pipework, gives information as to the fluid flow in the pipe as the eddies move with the fluid flow.

Finally, a further advantage is obtained in that the increase in sensing spatial resolution is obtained without requiring any substantial changes to the DAS or DTS equipment itself. Such a cable is therefore backwards compatible with existing DAS or DTS equipment, as well being used with new equipment. Account of the cable configuration needs to be taken when processing DAS or DTS outputs, however, but such processing can be done in software; no new sensor hardware is required.

In view of the above, from one aspect the present invention provides an optical fiber cable, comprising an optical fiber wound on a cable core.

As is well known in the art, the optical fiber typically comprises at least an optical fiber core which supports light propagation, and one or more optical fiber cladding layers. That is, the optical fiber may be conventional optical fiber, and preferably the optical fiber is bend insensitive (BI) fiber. The optical fiber core of the optical fiber is different and distinct to the cable core, which is the central core of the actual cable. The cable core is in most embodiments a flexible rod like structure that is separately formed from the optical fiber, the optical fiber being wound thereon.

Further features and aspects will be apparent from the appended claims.

BRIEF DESCRIPTION OF THE DRAWINGS

Further features and advantages of the present invention will become apparent from the following description of an embodiment thereof, presented by way of example only, and by reference to the drawings, wherein like reference numerals refer to like parts, and wherein:

FIGS. 11 and 12 are diagrams of further embodiments of the invention;

FIGS. 13 and 14 are diagrams illustrating aspects of the cable core in embodiments of the invention;

FIG. 15 is a diagrammatic cross-section of a cable clamp in accordance with an embodiment of the invention;

FIG. 16 is a perspective view of the cable clamp of FIG. 15;

FIG. 17 is a diagrammatic cross-section of a cable clamp in accordance with an embodiment of the invention;

FIG. 18 is a perspective view of the cable clamp of FIG. 17;

FIG. 20 is a diagrammatic cross-section of a cable clamp in accordance with an embodiment of the invention;

FIG. 21 is a perspective view of the cable clamp of FIG. 20;

FIG. 23 is a diagram of a further clamp arrangement according to an embodiment of the invention;

FIGS. 24 and 25 are diagrams illustrating different types of fiber winding about the cable core according to embodiments of the invention;

FIGS. 29 and 30 are diagrams of alternative shaped cable cores that may be used in embodiments of the invention.

DESCRIPTION OF THE EMBODIMENTS

Embodiments of the present invention will now be described with respect to FIGS. 1 to 4, and 6. As explained above, embodiments of the present invention provide a cable formed from optical fiber wound around a core. In preferred embodiments the windings are contiguous along at least part of, and preferably all of the length of the cable. In other embodiments the pitch of the winding may vary along the length of the cable. In some embodiments the pitch of the winding may vary by section of the cable, with some sections having a higher pitch winding than other sections. Moreover, as explained below, in some embodiments the optical fiber is not helically wound along the entire length of the cable, and instead the cable may have some sections where the optical fiber is not helically wound at all but instead proceeds parallel to the cable core, or else is wound with such a large helical pitch so as to be effectively straight. These embodiments provide advantages in allowing for longer cables to be provided, which have helically wound parts to provide increased spatial resolution only in those sections of the cable where required, for example where a section of cable is to be installed next to infrastructure to be monitored that requires the higher spatial resolution provided by the helical winding. In other sections of the winding, the optical fiber may be provided in straight lengths, or in very high pitch windings, which are effectively therefore straight.

In addition, also preferably provided in some embodiments is a protective sheath, preferably formed from a formable plastics material such as nylon, polyolefin, polyurethane, polyvinylchloride, or the like, to help protect the cable, and in some embodiments hold the windings in place about the core. The cable may be many meters in length, with larger diameter cores leading to lower bending radii of the fiber and hence lower bend losses, thus allowing for longer lengths of cable. The optical fiber used is in most embodiments bend insensitive (BI) optical fiber, which is commonly available and permits bending radii of as little as 5 mm, with low losses.

Figure 1:
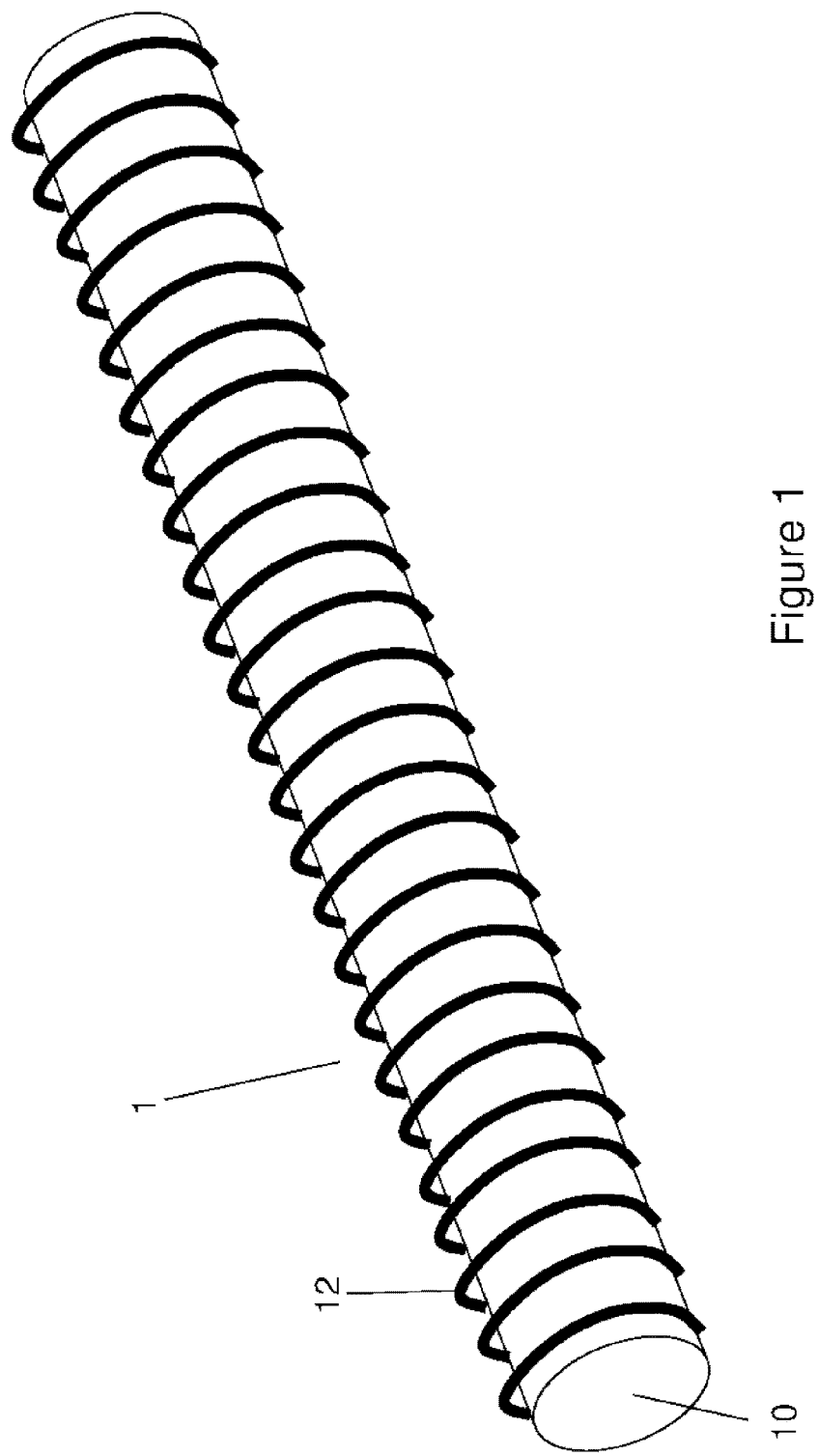
FIG. 1 is a diagram of a first embodiment of the present invention.

FIG. 1 illustrates an embodiment of the invention. Here, a cable 1 is formed from winding optical fiber 12 around a substantially cylindrical cable core 10, that is formed separately from the optical fiber. The cable core 10 may be of radius typically greater than 5 mm, usually 7 mm to 20 mm, but may be several centimeters or even tens of centimeters in radius. The cable core material is preferably a suitable plastic or rubber material, or the like, chosen dependent on the application. For example, for acoustic sensing applications a material that is preferably limp to minimise cross-talk between adjacent sensing locations along the fiber. Likewise, for temperature sensing applications a material that is highly insulating is also desirable, for the same reason of reducing cross-talk between adjacent sensing points on the fiber.

Figure 6:
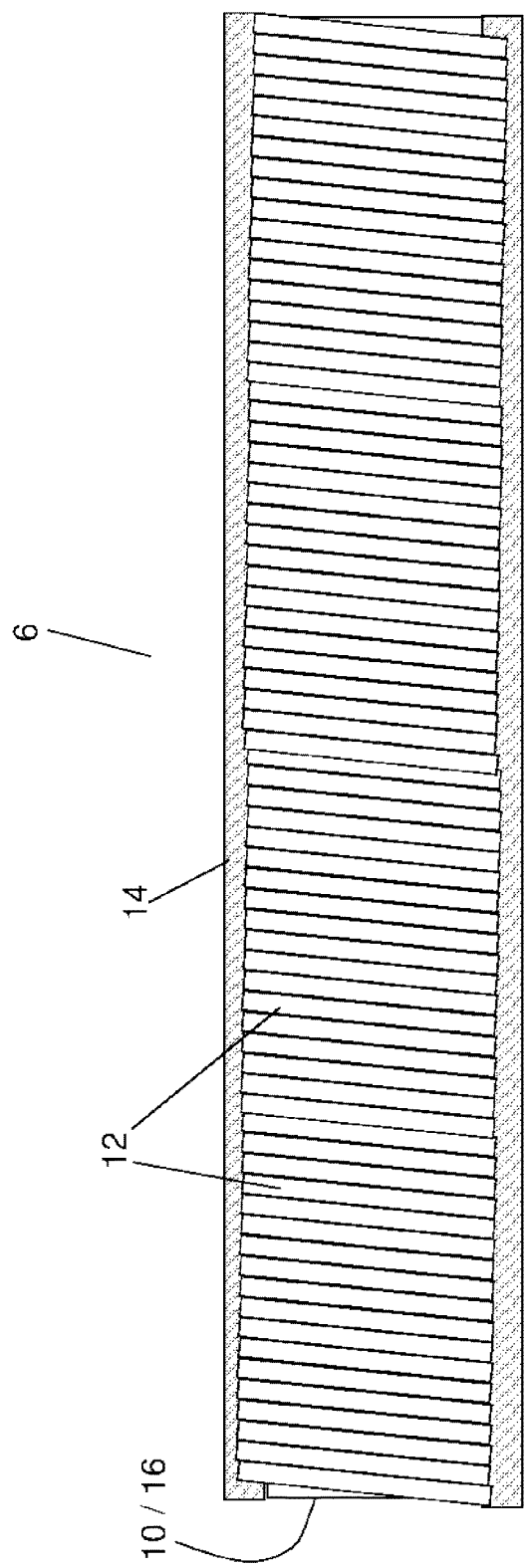
FIG. 6 is a diagram of a sixth embodiment of the present invention.

The pitch of the winding may be selected dependent on application, and may be varied at points along the cable, so as to vary the longitudinal sensing resolution of the cable along the cable length when it is connected to a suitable DAS or DTS monitor. As shown in FIG. 6, a preferred embodiment is where the fiber windings are contiguous, as this provides maximum longitudinal sensing resolution along the cable, with the actual sensing resolution then being given by the winding diameter, dictated by the cable core diameter. Hence, the cable core diameter can be selected to give the desired longitudinal sensing resolution along the cable, for a given native sensing resolution (e.g. ~5 m) of the DAS or DTS equipment.

Figure 2:
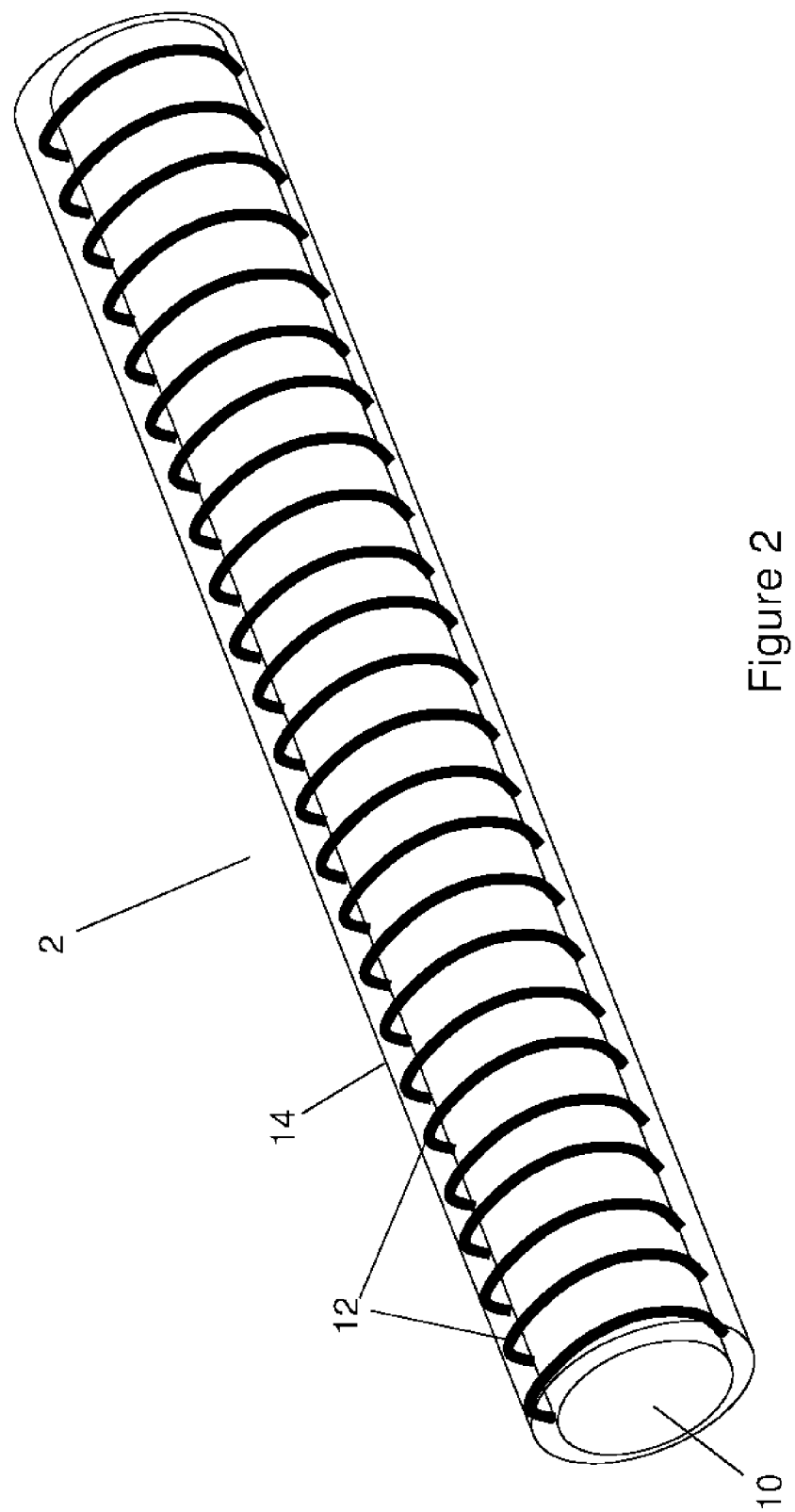
FIG. 2 is a diagram of a second embodiment of the present invention.

FIG. 2 illustrates a further embodiment, where the fiber is covered by a protective sheath 14, usually made from a plastics material such as nylon, polyolefin, PVC or polyurethane. The sheath is preferably a close fit, and heat-shrink materials such as nylon and polyolefin may be used, to give such a close fit using heat shrink techniques. The close fit helps to keep the fiber coil in place, and also helps to conduct sound or heat to the fiber, as appropriate.

Figure 3:
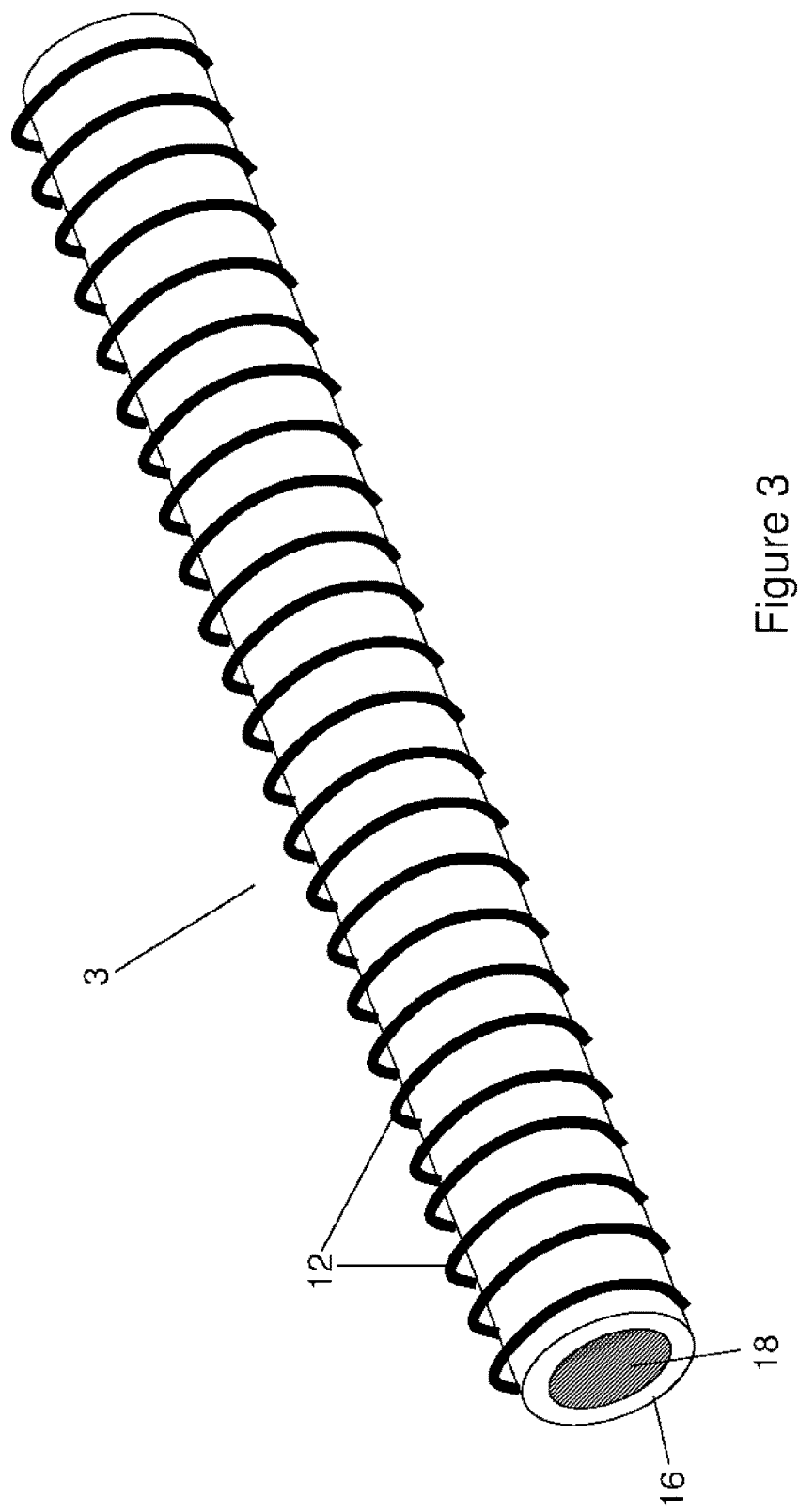
FIG. 3 is a diagram of a third embodiment of the present invention.

FIG. 3 shows a further embodiment, where the cable core 16 is formed with a hollow 18, which may run the length or only part of the length of the core. In this respect, where a hollow centre portion 18 is provided the cable core forms a hollow tube. Such an arrangement can be used to reduce the weight of the cable, to allow for easier transport and deployment.

Figure 4:
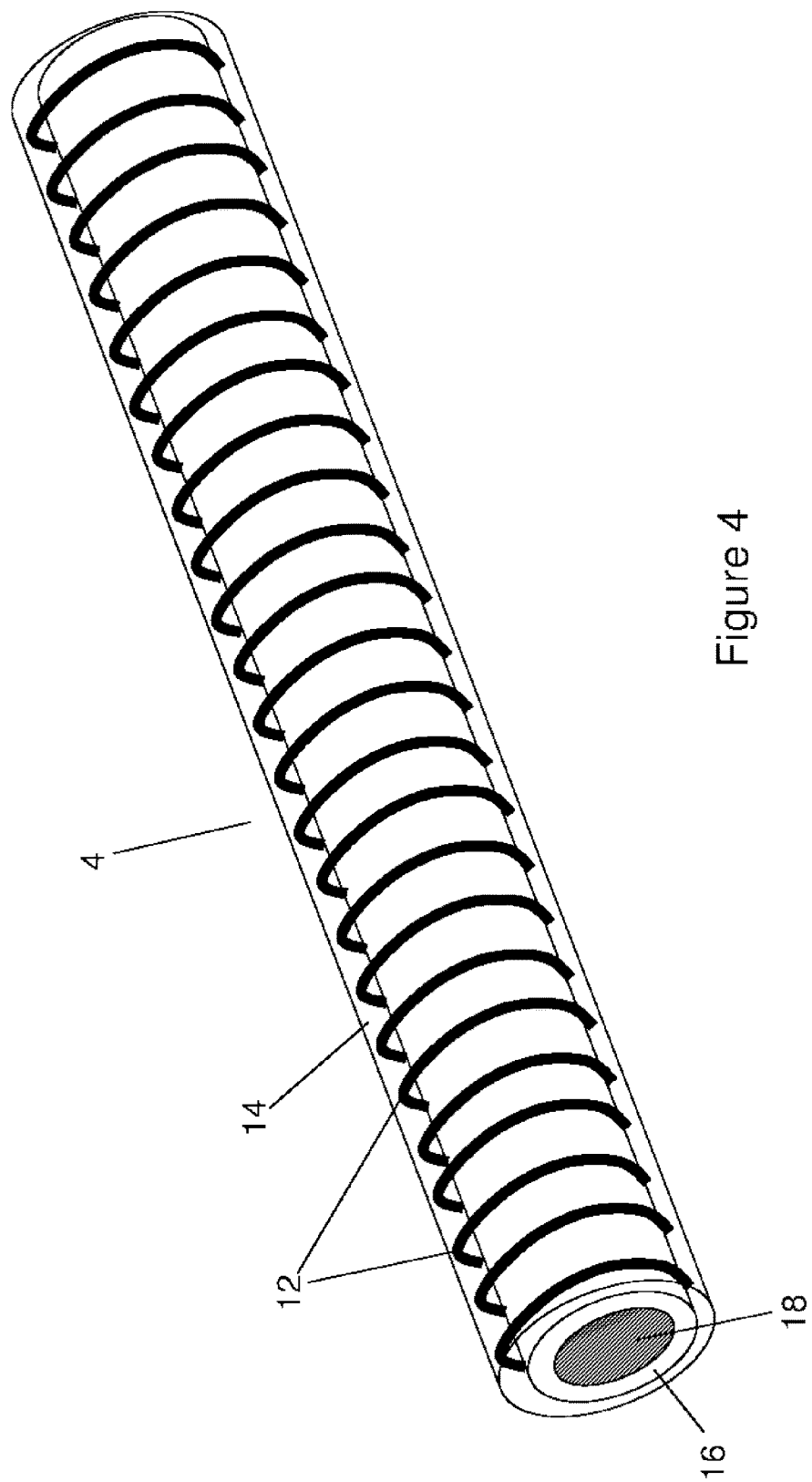
FIG. 4 is a diagram of a fourth embodiment of the present invention.

FIG. 4 illustrates a further embodiment where a hollow cable core 16 is provided with hollow 18, having the fiber 12 helically wound thereon, and also provided with protective sheath 14. The arrangement of FIG. 4 therefore provides the advantages of both the arrangements of FIGS. 2 and 3.

Figure 5:
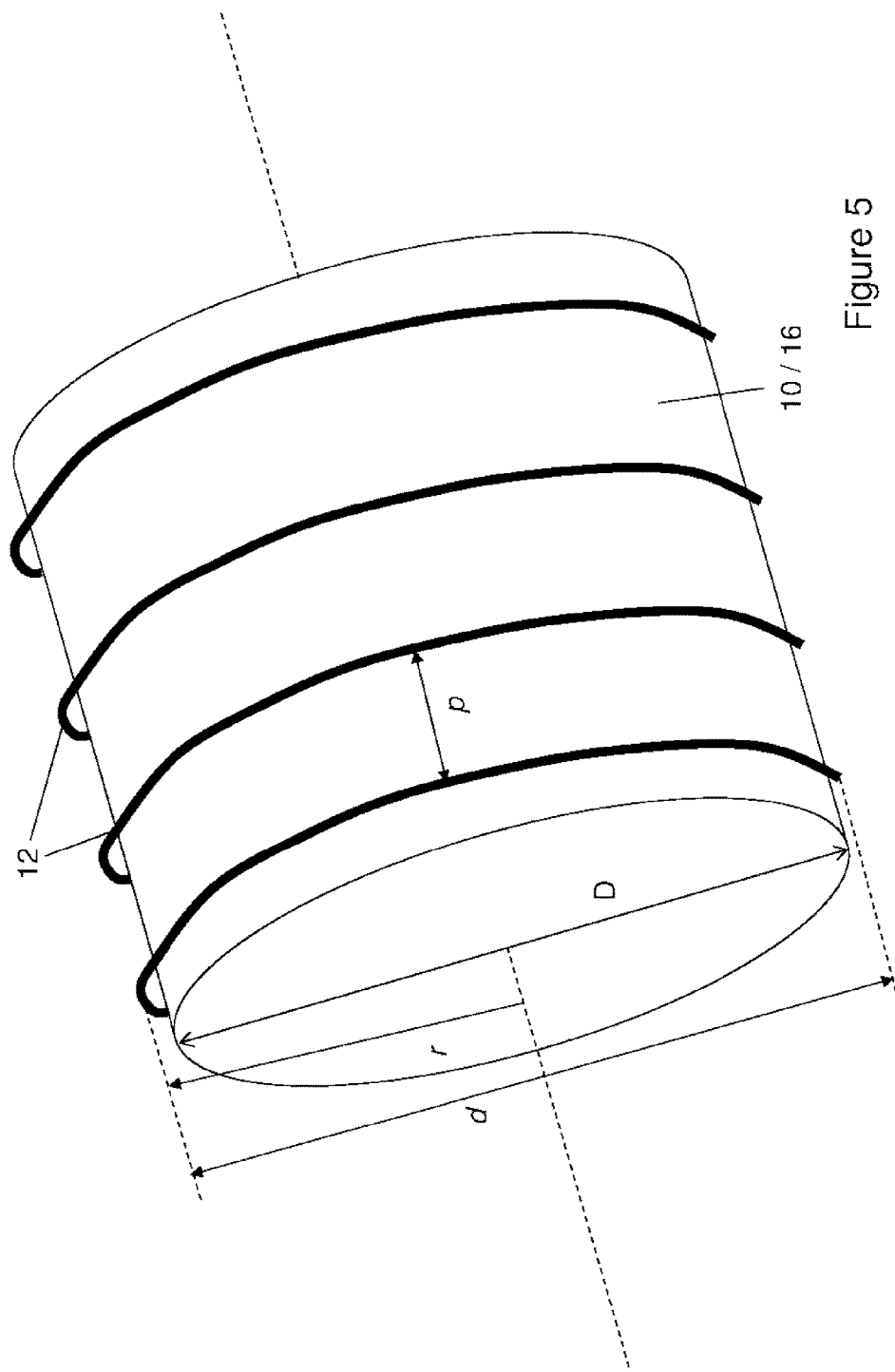
FIG. 5 is a diagram illustrating various parameters in embodiments of the invention.

Several specific examples will now be described to illustrate the above principles. Before doing so, however, FIG. 5 illustrates several design parameters that can be adjusted to provide different embodiments of the invention. Specifically, FIG. 5 shows a close up of a solid cable core 10 or a hollow cable core 16, around which optical fiber 12 is helically wound. The cable core 10 or 16 itself has a diameter D, but as the optical fiber itself has some width (it is not infinitely thin), the effective diameter for calculation purposes is shown by d, with radius r=d/2. The pitch of the winding is shown by p, which again is measured from the centre-lines of the optical fiber windings.

In embodiments of the invention, a fiber optic cable is wrapped around a central tube in a manner similar to that of a helix. Therefore, it is possible to model the fiber optic cable as a helix with a finite width in order to determine how much of a specific optical fiber is needed when it is wrapped around a specific cable core tube in order to achieve a desired sensing resolution.

A helix is a 3-dimensional line formed uniformly around a cylinder, wherein the tangent of the line at any point makes a constant angle with the axis of the helix. In Cartesian co-ordinates, any point on the helix may be found using:

$$x(t) = r\cos(t)$$
$$y(t) = r\sin(t)$$
$$z(t) = ct \qquad (1)$$

wherein t is the length of the line at that point, r is the radius of the helix and c is the pitch of the helix.

The pitch of the helix is the amount by which the helix rises along its axis as it turns, such that $2\pi c$ defines the amount by which the helix has turned after one full rotation. That is to say the pitch is the distance between adjacent turns in the helix. The total length, T, of the line along the length of the helix is found using Pythagoras Theorem wherein:

$$T = \sqrt{r^2 + c^2} \qquad (2)$$

Embodiments of the invention use a helix formed by an optical fibre of finite width. The rise angle of the coils of the helix is the angle that the coil makes with the base of the helix, or in embodiments a transverse planar end of the cable, and is defined as:

$$\theta = \arctan\left(\frac{c}{2\pi r}\right) \qquad (3)$$

Figure 7:
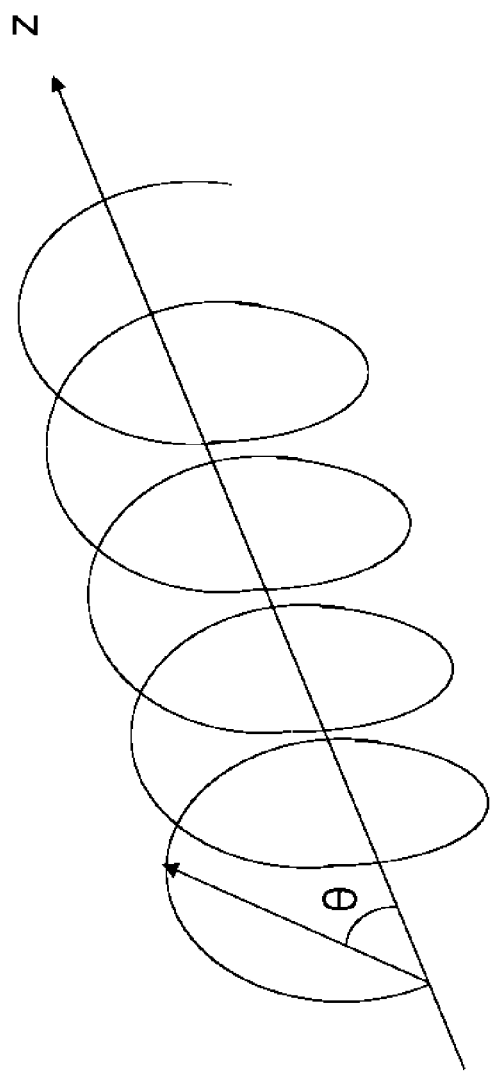
FIG. 7 is a diagram illustrating a further parameter in embodiments of the invention.

The rise angle is illustrated graphically in FIG. 7. The length, L, of the fiber used to make the helix can thus be calculated using:

$$L = 2\pi r\left(\frac{n}{\cos\theta}\right) \qquad (4)$$

wherein n is the number of coils that make up the helix.

In embodiments of the invention, the radius used to calculate the length of the optical fiber needed is the radius of the cable core 10 or 16 plus the radius of the optical fiber being used. In cases where the optical fiber is bound contiguously around the central tube, the pitch is effectively the diameter of the optical fiber being used.

For example, consider an optical fiber with a bend radius of 5 mm that is contiguously wrapped around a cable core tube that is 10 mm in diameter. If the diameter of the optical fiber is 1 mm, then there are in theory 1000 turns of optical fibre per meter along the length of the cable, although in reality it will likely be slightly less than this due to small gaps between each winding. Using equation (3), the angle of rise for each turn is calculated to be approximately 0.3 radians. From this, equation (4) may then be used to calculate that approximately 35 m of optical fiber is needed per meter of cable. If the native sensing resolution of a DAS or DTS connected to the optical fiber is 1 m, then approximately 35 sensing points per meter will be achieved along the length of the cable, to give a longitudinal sensing resolution along the cable of around 3 cm. That is to say, a sensing point around every 29 turns of the fiber optic cable would be obtained.

In comparison, as another example consider an optical fiber with a bend radius of 5 mm that is now contiguously wrapped around a tube that is 50 mm in diameter. If the diameter of the optical fiber is 1 mm, then there are at most 1000 turns of optical fibre per meter along the length of the cable, although again in practice there will be slightly fewer than this due to winding inefficiencies. Using equation (3), the angle of rise is calculated to be approximately 0.358 radians and, using equation (4), the length of the optical fiber needed is calculated to be approximately 160 m per meter of cable. Therefore, if the native sensing resolution of a DAS or DTS connected to the optical fiber is 5 m, approximately 32 sensing points per meter will be achieved along the length of the cable, to give a longitudinal sensing resolution of ~3 cm. That is to say, a sensing point around every 31 turns of the fiber optic cable would be obtained in this case.

Details of further non-limiting worked examples are given below, which assume a 5 m native sensing resolution. For higher native sensing resolutions, the resulting longitudinal sensing resolution given would scale down accordingly:

Example 1

Cable core, d=10 mm, r=5 mm
Fibre, d=3 mm, r=1.5 mm, 1000 turns
Total Radius=6.5 mm
Pitch=3 mm
θ=0.07332 radians
L=40,950.7 mm=40.95 m
=>~8 sensing points, sensing point every ~122 turns
Longitudinal Sensing Resolution ~36.63 cm Example 2

Cable core, d=50 mm, r=25 mm
Fibre, d=3 mm, r=1.5 mm, 1000 turns
Total Radius=26.5 mm
Pitch=3 mm
θ=0.01802 radians
L=166,531.4 mm=166.5 m
=>~33 sensing points, sensing point every ~30 turns
Longitudinal Sensing Resolution ~9.00 cm Example 3

Cable core, d=150 mm, r=75 mm
Fibre, d=3 mm, r=1.5 mm, 1000 turns
Total Radius=76.5 mm
Pitch=3 mm
θ=0.00624 radians
L=480,673.04 mm=480.7 m
=>~96 sensing points, sensing point every ~10 turns
Longitudinal Sensing Resolution ~3.12 cm Example 4

Cable core, d=50 mm, r=25 mm
Fibre, d=3 mm, r=1.5 mm, 1000 turns, 5 μm gap between turns
Total Radius=26.5 mm
Pitch=3.005 mm
θ=0.018046 radians
L=166,531.5 mm=166.5 m
=>~33 sensing points, sensing point every ~30 turns
Longitudinal Sensing Resolution ~9.02 cm Example 5

Cable core, d=10 mm, r=5 mm
Fibre, d=3 mm, r=1.5 mm, 1000 turns, 5 μm gap between turns
Total Radius=6.5 mm
Pitch=3.005 mm
θ=0.073446 radians
L=40,951.1 mm=40.95 m
=>~8 sensing points, sensing point every ~122 turns
Longitudinal Sensing Resolution ~36.69 cm Example 6

Cable core, d=50 mm, r=25 mm
Fibre, d=3 mm, r=1.5 mm, 1000 turns, 10 μm gap between turns
Total Radius=26.5 mm
Pitch=3.01 mm
θ=0.018076 radians
L=166,531.6 mm=166.5 m
=>~33 sensing points, sensing point every ~30 turns
Longitudinal Sensing Resolution ~9.04 cm Therefore, it is clear that there is a direct correlation between the diameter of the tube used and the pitch of the coiled fiber with the sensing resolution of the entire arrangement, whereby the more fiber needed to provide a number of turns along the length of the tube, the more sensing points that can be achieved along that length, for a given native resolution of the sensing device to which the optical fiber cable is connected.

In the embodiments described so far, the pitch of the helical winding has been substantially constant along the length of the cable. However, this need not be the case, and in fact with low pitches the resulting cable may be too short for some applications. Therefore, in further embodiments, described by way of example with respect to FIGS. 8 to 10, the pitch of the helical winding need not be constant along the length of the cable, and may instead vary along its length. For example, sections of cable may be provided which have a low pitch meaning there are a large number of turns per unit length, and spatial sensitivity is increased. In contrast, other sections of the cable may have a higher pitch, so there are fewer turns per unit length, and spatial sensitivity, whilst higher than if there was no winding, is lower than in the case where there are more windings of lower pitch. In addition, further sections of the cable may have no effective helical winding at all, such that effectively the optical fiber runs parallel to the cable core. In these sections the spatial resolution is the native resolution of the DAS or DTS system to which the cable is connected.

Figure 8:
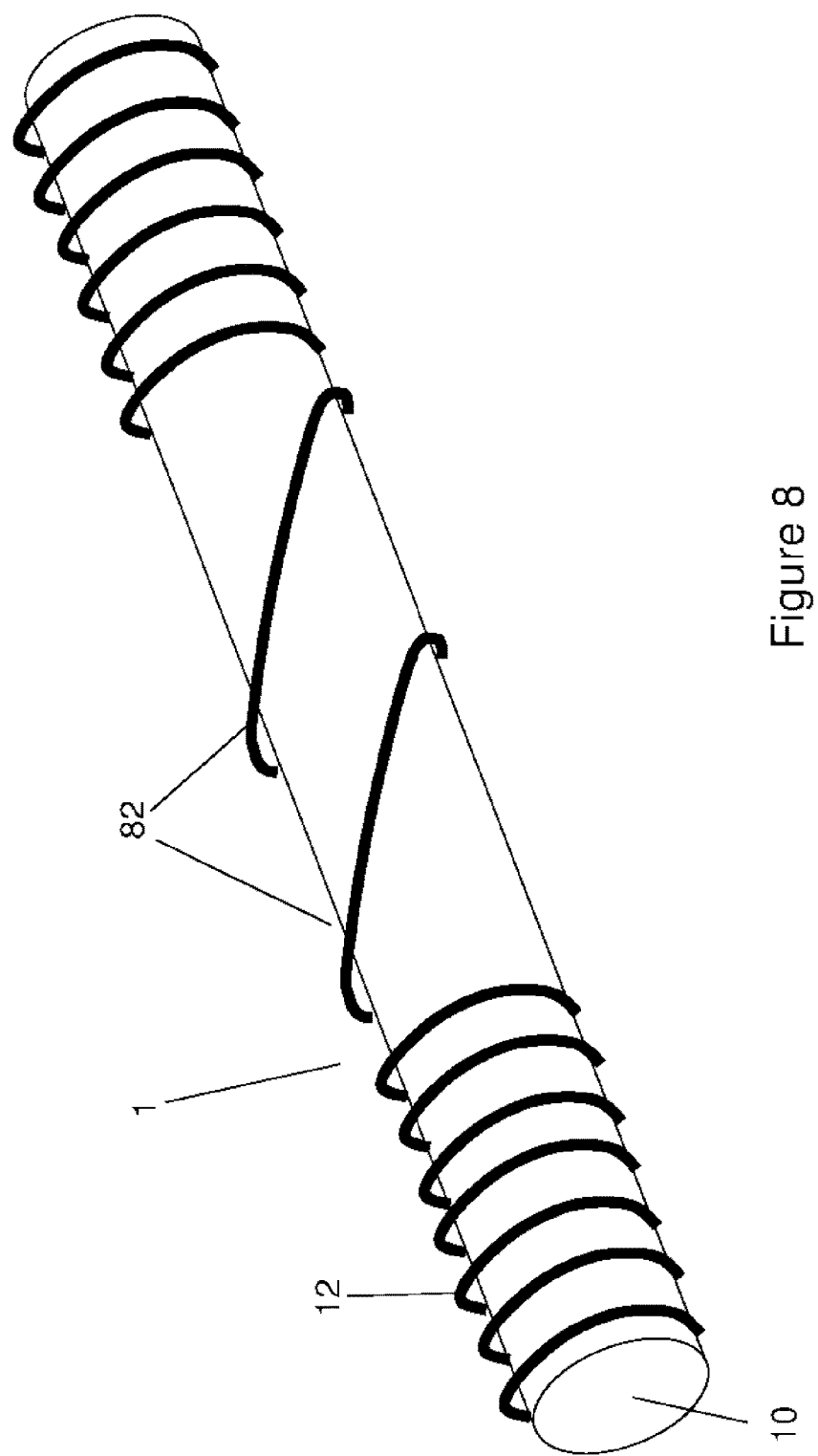
FIG. 8 is a diagram of a further embodiment of the invention.

FIG. 8 illustrates one example of the above. Here, the optical fiber 12 is helically wound on the cable core 10 in three sections. A first section has a lower helical pitch, and hence would provide higher spatial resolution in use. A second section, provided by windings 82 is then wound on the cable core at a much higher helical pitch, and hence would provide a lower spatial resolution than the first section. A third section is then wound at the lower helical pitch, which may be the same pitch as the first section, and thus would provide higher spatial sensing resolution than the second section. For example, the first and third sections may be provided on predetermined sections of the cable which when installed it is known will be next to infrastructure which requires monitoring with the higher spatial resolution. In contrast, the second, lower resolution, section of the cable may run next to parts of the infrastructure which only need the lower resolution.

Figure 9:
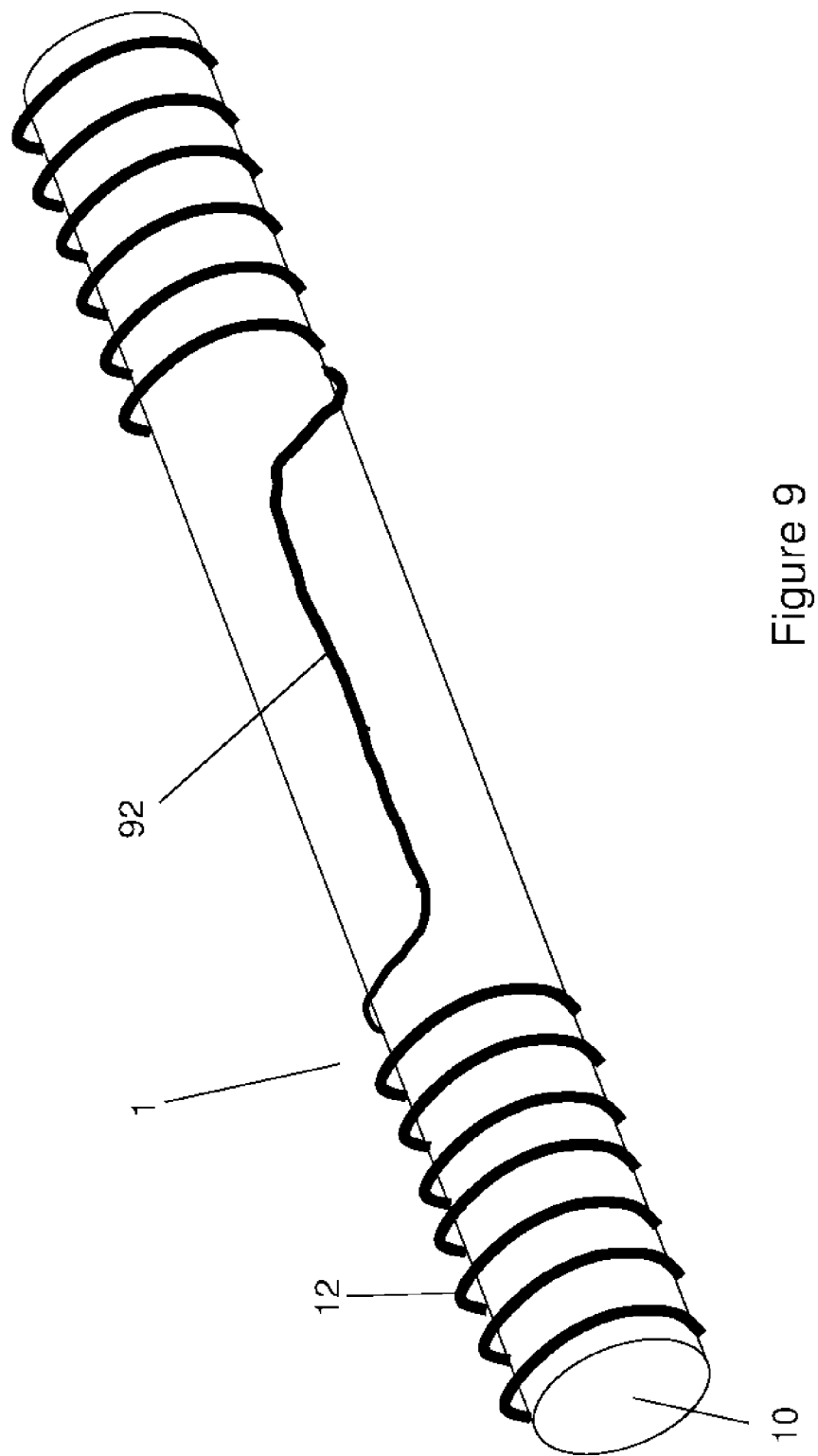
FIG. 9 is a diagram of a further embodiment of the invention.
Figure 10:
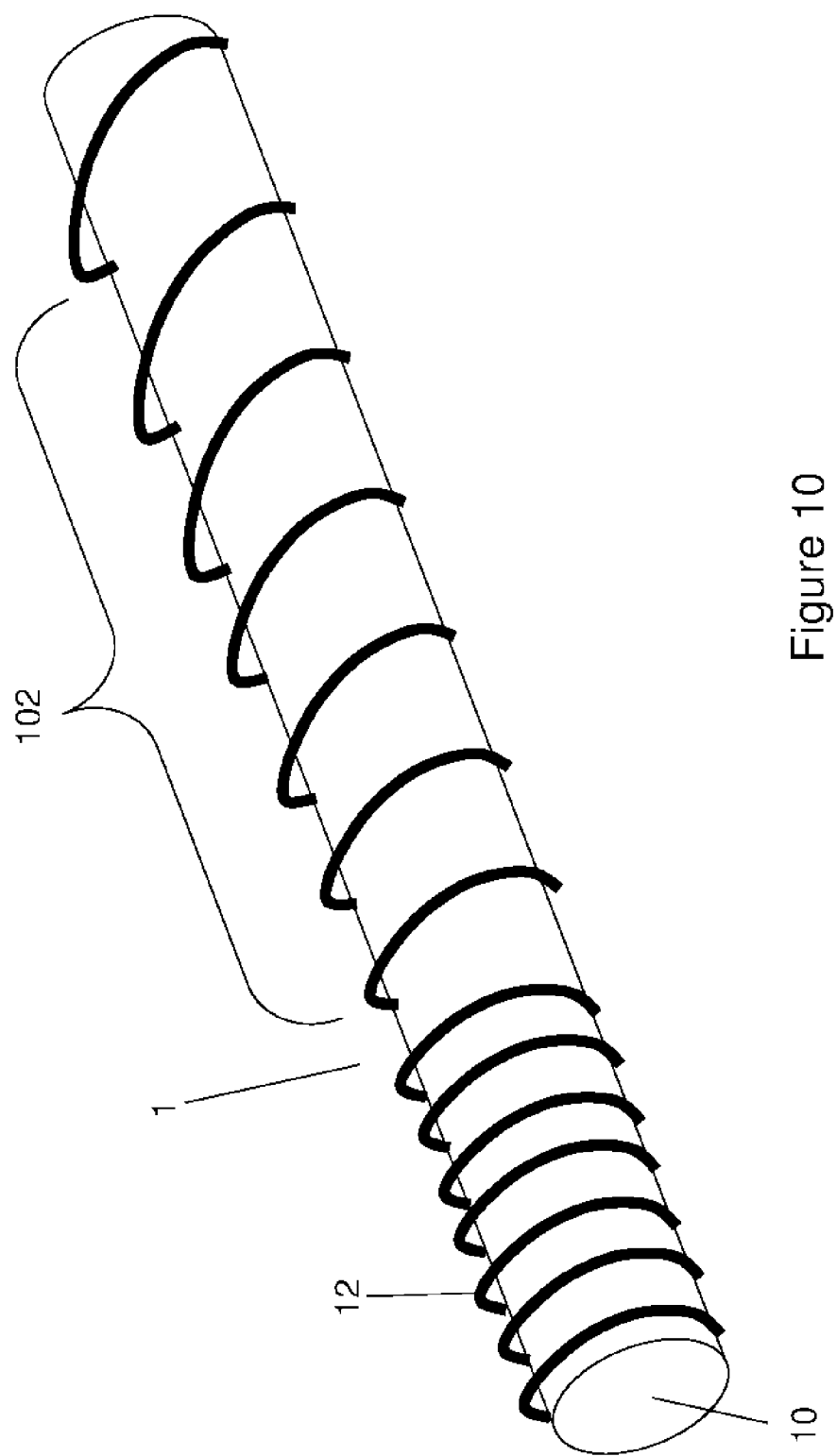
FIG. 10 is a diagram of a further embodiment of the invention.

A further embodiment illustrating the same concept is shown in FIG. 9. Here, the first and third sections are helically wound on the cable core 1 with a relatively low pitch to give a high spatial resolution. However, because that spatial resolution is not required along the length of the cable the second section 92 which joins the first and third sections is formed from substantially straight fiber, which runs parallel to the core. In this section the sensing resolution is the native resolution of the sensor system in which the cable is being used, for example around 1 to 5 m in a present DAS system FIG. 10 illustrates a further embodiment, where the cable is provided with a section 102 where the helical pitch changes along the length of the section in a known and determinative manner, for example in accordance with a mathematical function. For example, as shown in FIG. 10, the pitch may change across a section of the cable in accordance with a monotonic function, which may be linear or non-linear as required. Likewise, in other sections of the cable the pitch may decrease in corresponding ways. Using such techniques, the helical pitch, and hence the spatial resolution of the cable can be controlled along its length.

Using the techniques of FIGS. 8, 9, and 10 it will be understood that bespoke cables may be designed which have defined sensing resolutions at different sections along their lengths. Such resolutions may increase or decrease as required by controlling the pitch of the helical winding, in that a lower pitch provides for a higher spatial resolution, and a higher pitch provides for a lower spatial resolution. As such, for any particular application a helically wound sensing cable can be designed that provides for the appropriate spatial sensing resolution at every point along the cable in dependence on the intended installation of the cable. For example, where the cable is to be clamped to pipework every 8 meters or so, then a helically wound section having a low helical pitch, and hence higher spatial resolution, may be provided every eight meters along the cable, to be installed such that the helically wound sections are the sections of cable which are attached to the clamps. In between, where there is low acoustic coupling between the pipework and cable due to there being no clamp, either a helical section of high pitch, or a straight line section may be provided. By interspersing helically wound sections that provide high spatial resolution with straight (or effectively straight i.e. high pitch helical windings) sections of fiber, then the total length of the cable can be made longer.

In further embodiments of the invention, the cable core can be adapted to give a directionally selective acoustic and vibration response. For example, FIG. 11 illustrates an embodiment where the cable core 10 has had notched spaces 114 formed therein on opposite sides thereof, within which is placed in each an acoustically reactive mass 112. The acoustically reactive mass 112 is formed from a different material to the rest of the cable core, so as to provide a higher or lower rigidity than the remainder of the cable core. This provides for a circumferential directional acoustic response of the cable core to incident acoustic energy, either making the cable directionally more or less sensitive to the incident acoustic energy than the rest of the cable, depending on the material chosen for the acoustic reactive mass 112. For example, depending on the material chosen and its mechanical rigidity compared to the rest of the cable core, acoustic energy incident on the sides of the cable provided with the notched spaces (e.g. from an up or down direction in the plane of the page in the examples of FIGS. 11 and 12) may cause either a higher or lower, but otherwise different, response in the surrounding optical fiber 12 than acoustic energy arriving from other directions that are incident on other sides of the cable where there are no such notches (e.g. from an orthogonal direction in or out of the page in the examples of FIGS. 11 and 12).

In FIG. 12, the acoustic reactive masses may be resiliently mounted within the notches 114, for example with small springs 122. It should be noted that such notches 114 provided with acoustically reactive masses 112 may be provided only on one side of the cable, or may extend at various points around the circumference thereof, to allow the circumferential directional response of the cable to be tuned. In addition, the material of the various acoustic reactive masses 112 may be altered between respective masses, to provide a further control element which allows the acoustic vibration response of the cable to be tuned.

An alternative acoustic tuning mechanism for the cable core is shown in FIG. 14. Here, the cable core 16 is provided with a hollow 18, as previously described in various embodiments. In order to tune the directional acoustic response of the cable, a cross-member 132, which may be formed of an acoustically reactive material which may be the same or different to the rest of the cable core, is provided, which extends across the hollow 18, to join the inner wall of the cable core 16 with the opposite inner wall. Such a cross-member 132 adapts the directional acoustic response of the cable core, such that the resulting cable is more sensitive to incident acoustic energy from one or more directions than from others. For example, the resulting cable may be more sensitive to incident acoustic energy coming from directions substantially parallel with the plane of the cross-member, depending on the material used to form the cross-member. Alternatively, if the cross member is made from a material that is acoustically inert (i.e. absorbs acoustic vibration), then the opposite effect may be obtained and the acoustic cable is then less sensitive to acoustic energy incident from the planar direction of the cross-member than from directions orthogonal thereto.

In some embodiments, plural such cross-members may be provided, extending across the hollow 18 in a cross or star configuration, to give plural directional planes where the incident acoustic energy is so adapted.

One issue that can affect the performance of the cable is how the cable is attached to the structure that it is monitoring. FIGS. 15 and 16 show one such clamp, arranged in a "FIG. 8" configuration. As shown in FIG. 15, the clamp comprise a first, larger, loop 142 which loops round the infrastructure, such as pipework 182, which is connected in a FIG. 8 configuration with a second, smaller, loop 146, which passes around the optical fiber cable 1, 2, 3, or 4. FIG. 16 illustrates the arrangement in more detail, from where it can be seen that the clamp is formed from a continuous loop sheet of metal or some other suitable stiff material, having large loop 142 arranged around pipe 182, and small loop 146 arranged around fiber cable 1,2,3, or 4. In order to allow the figure-of-eight configuration, slots 144 are formed in the upper part of the large loop 142 around the pipe 182, and belts of material extend there-through to the connect to the upper, smaller, loop 146.

In use acoustic vibrations in the pipe 182 cause expansions and contractions in the large loop 142 that are then transmitted, via the figure-of-eight configuration of the clamp, the total length of the two loops of the clamp being fixed, to the smaller loop 146, where the expansions and contractions are then imparted to the optical fiber cable as acoustic vibrations.

Advantageously, this design of clamp allows coupling of the cable to the pipe 182 along a fairly long region. For example, the length of the clamp may be as many as 3 or 4 pipe diameters (although it may be longer or shorter). Such a length is useful as 3 to 4 pipe diameters is the typical length of which an eddy in the flow within the pipe will extend. Such clamps are therefore particularly useful for eddies tracking for flow monitoring purposes.

A further design of clamp forming an embodiment of the invention and which is designed for acoustic coupling is shown in FIGS. 17 and 18. Here, clamp 162 comprises a clamp body 164 which is a ring extending around pipe 182 to be monitored. Clamp body 164 may be provided with a hinge or the like (not shown), to allow the clamp body to be placed around the pipe. Mounted on the clamp body 164 is a two part cable clamp 166, and upper part of which is detachable to allow cable 1, 2, 3, or 4 to be placed therein. The upper part of the cable clamp 166 is then secured to the lower part by way of screws 167, or similar such connectors. Cable clamp 166 is provided with a suitable shaped i.e.

circular interior channel into which the cable 1, 2, 3, 4 is received, and an acoustically conductive packing layer 168 is provided on the interior of the channel, to ensure acoustic and vibration coupling 360 degrees around the cable between the cable and the cable clamp. The clamp body 164 and cable clamp 166 are made from rigid materials such as metal to allow for good acoustic conduction.

In use, acoustic vibrations from within the pipe 182 are transmitted via the clamp body 164 to the cable clamp 166, and from the clamp 166 via the acoustically conductive packing layer 168 to the cable 1, 2, 3, or 4. The rigid construction of the clamp provides for good acoustic conduction between the pipe and the optical fiber cable.

In addition, as with the previous embodiment, such a clamp design permits the length of the clamp along the pipe to be as long as is required, thus providing a coupling point between the pipe and cable for as long as necessary. The clamp may therefore be several (e.g. as long as 3 to 4) pipe diameters, which as noted previously allows for very good eddies tracking and flow monitoring performance.

FIGS. 20 and 21 show a further clamp according to an embodiment of the invention. This clamp is similar to the embodiment of FIG. 17, except that clamp body 164 is not included, and the cable clamp 166 is held directly onto pipework 182 by a metal band 202. The metal band 202 ensures that the cable clamp 11 is held tightly in place against the pipework, such that vibrations are transmitted between the pipework and the cable clamp 166, and then on to the cable 1, 2, 3, 4. As shown in FIG. 21, as in previous embodiments the cable clamp 166 and metal band 202 can extend along the pipework by several diameters of the pipework, typically between 2 to 5 diameters, and preferably 3 to 4 diameters. As before, this allows for very good eddies tracking and flow monitoring performance.

Figure 22:
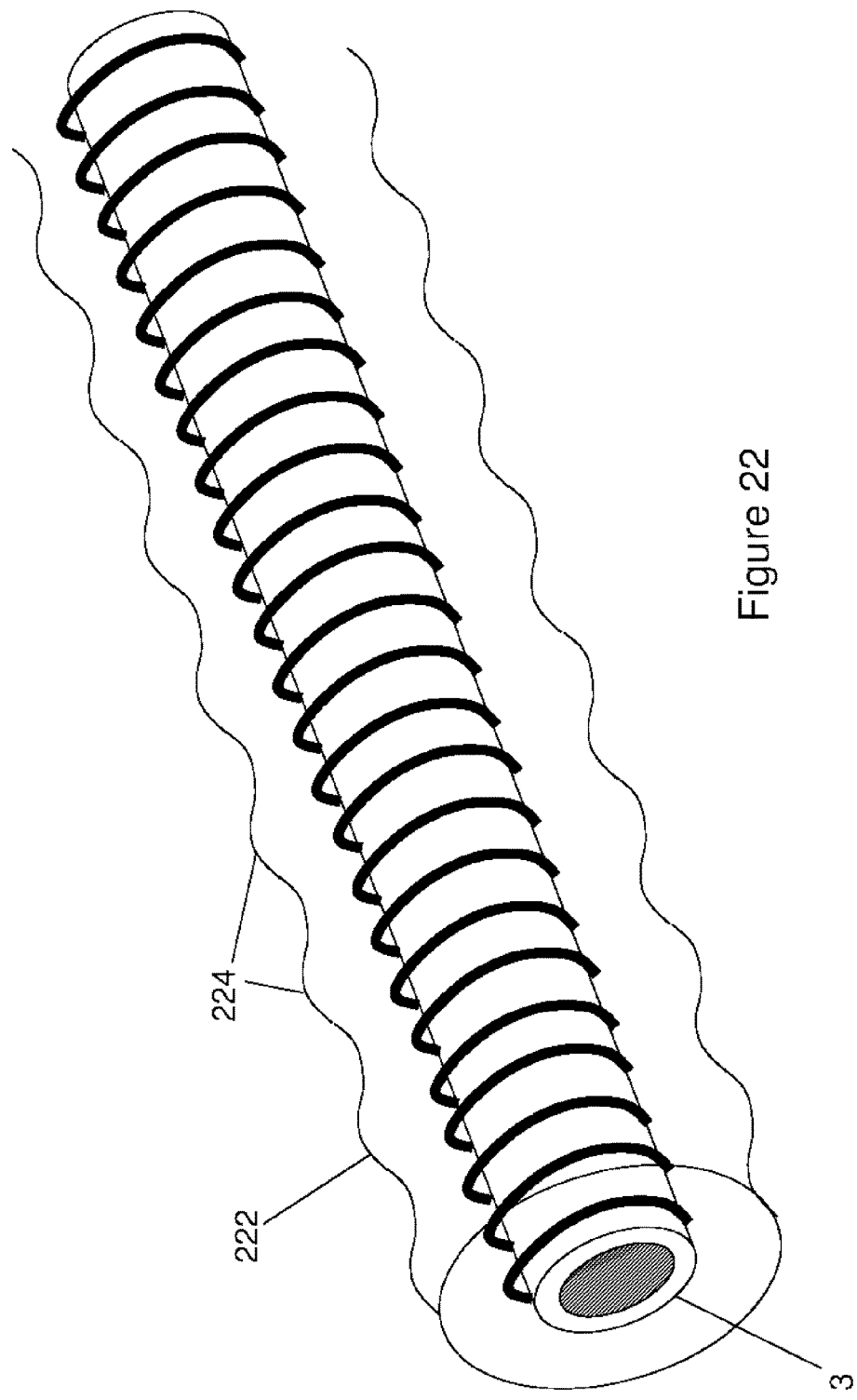
FIG. 22 is a perspective view of a cable covering that may be used in embodiments of the invention.

FIG. 22 illustrates a further modification that may be made to the cable 1, 2, 3, 4, in that the cable may be covered along at least a portion or the whole of its length by a ridged sleeve 222. The ridged sleeve 222 is provided at intervals along its length with lateral ridges 224, extending around the circumference of the sleeve 22. The purpose of the ridged sleeve is to allow the cable to be gripped more effectively by clamps, such as any of the clamps described previously.

Turning now to a consideration of the angle of helical wrapping and the pitch of helical wrapping of the optical fiber, preferably the pitch of wrapping is different for different uses. For example, for eddy tracking, a higher resolution is needed, and hence a tighter wrapping with a shallower helical pitch is usually required. Conversely, for flow monitoring applications, a lower resolution is required, and hence a higher helical pitch can be provided, with a looser wrapping i.e. the wrapping for flow monitoring can have less length of fiber wrapped per unit length of cable, than the case for eddy tracking. For example, for eddy tracking with a high resolution, a tighter wrapping with a shallower angle may be, for example, in the range of 5° to 25° of helical angle, whereas for flow monitoring, where a higher helical angle can be used to provide a lower spatial resolution, the helical angle may be in the range of 25° to 50° or 60°. Generally, the higher the helical angle the higher the helical pitch that is obtained, the pitch being the distance covered by the fiber through one whole helical turn.

Regarding the angle of wrapping of the cable core more generally, wrapping the fiber in a helical pattern with a helical pitch of 30° balances out hoop strain and longitudinal strain on the fiber, and hence in one embodiment the fiber is wrapped continuously at 30°, to optimise these two characteristics. More generally, however, the range of helical wrapping pitch angle should be less than 45°, although in some cases the wrapping angle can be as much as 60°. It is thought that a wrapping pitch angle of approximately 45° will be useful for seismic detection applications.

Figure 26:
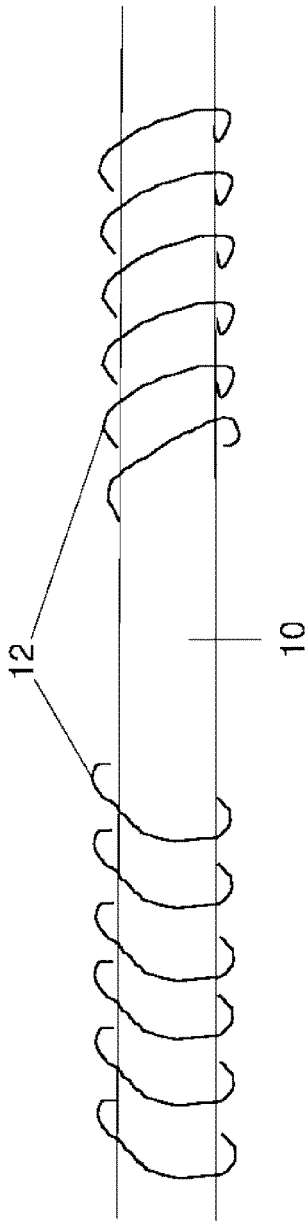
FIG. 26 is a diagram illustrating that the winding angle can change in different parts of the cable in embodiments of the invention.

FIGS. 24 to 26 illustrate examples of how the optical fiber may be wrapped around the cable core 10. FIG. 24 illustrates an arrangement with a relatively high pitch helix, which double backs on itself. Strictly speaking, therefore, this helical wrapping may not be strictly helical in shape, in that the winding doubles back on itself in the longitudinal direction, although it has been found to be effective. Within the present specification, "helical" wrapping is therefore used to indicate a spirally wound fiber wrapping, where the fiber is wound around a cable core in a configuration that is helical, spiral, or other wound configuration that generally results in the windings of the wound fiber extending along the core.

FIG. 25 gives an alternative wrapping, which is a cycloidal design. Here, the optical fiber 12 is wrapped around the cable core 10 in such a way such that if the cable core was removed whilst the wrapping maintained, and the wrapping then flattened to form a two dimensional pattern, the pattern would be a series of two dimensional overlapping loops. We refer to this wrapping arrangement as a cycloidal arrangement.

In some embodiments, the direction of pitch of the helical wrapping can be altered at different lengths along the cable. Thus, for example, as shown in FIG. 26, the left hand part of FIG. 26 illustrates that the helical wrapping is angled such that each winding element tilts from left to right across the page of FIG. 26, whereas the right hand part of FIG. 26 illustrates the opposite, i.e. the fiber windings tilt or are angled from right to left. For the same reference, the two types of winding shown could be considered to have positive or negative helical pitch angles. The direction of the pitch of the helical wrapping can change more than once along the cable, and a plurality of different sections, with different pitch directions, and different pitch angles, can be provided along any one helical cable. In some embodiments, there can be a frequency selective wrapping along the cable.

Figure 27:
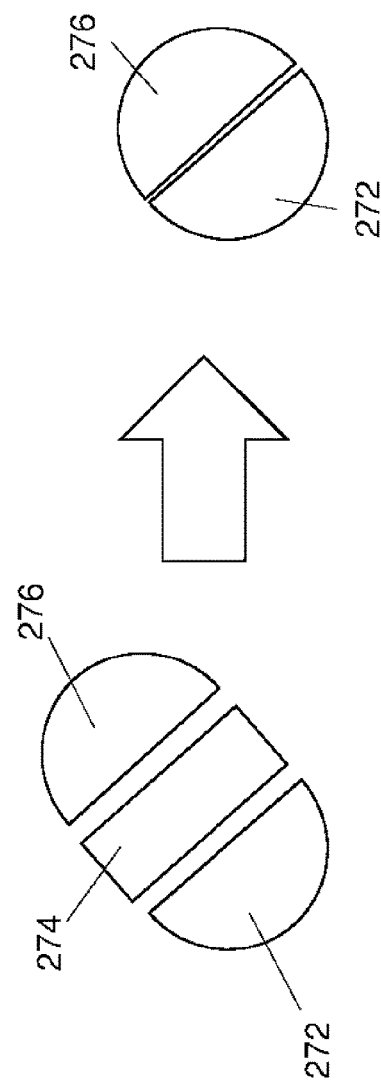
FIG. 27 is a diagram illustrating one method of making a wound fiber cable with angled windings according to one embodiment.

Regarding how to manufacture an angled helical cable as described above, FIG. 27 illustrates one technique for so doing. Here, a cable core is provided comprising three components 272, 274, and 276. Parts 272 and 276 are substantially semi-circular in cross section, whereas part 274 is sandwiched between the semi-circular parts, and is substantially rectangular in cross section. Parts 272, 274, and 276 extend in a longitudinal direction into the page of FIG. 27, so as to provide an extended cable core, of the cross section shown. Although in the left hand part of FIG. 27, parts 272, 274, and 276 are shown slightly exploded, this is for information purposes only, and in use the parts would abut against each other.

In order to make the angled helical wrapping around the cable core formed by parts 272, 274, and 276, a fiber optic cable is spirally wound around the cable core formed by parts 272, 274, and 276 collectively, with a shallow helical pitch angle, and the fiber substantially contiguously wrapped with each spiral winding of the fiber next to the previous one. In order to increase the helical pitch angle of the cable, the central part 274 of the cable core is then slid out from between parts 272 and 276 once the helical fiber has been wrapped there around. The parts 272 and 276 are then moved in opposite longitudinal directions relative to each other, such that one of the parts 272 or 276 is effectively slid longitudinally over the other part 272 or 276. As the parts move relative to each other in this fashion, the helical windings become tilted with respect to each other, and as the semi-circular cross sectional core elements continue to move, the helical windings therearound as they tilt cause the two semi-circular cross sections to be brought together, as shown in the right hand part of FIG. 27. Provided that the helical windings do not slip along the core parts 272 or 276 as the core parts 272 and 276 are moved relative to each other, the result is a cable with a core of substantially circular cross section formed from two semi-circular parts 272 and 276, but with the optical fiber wrapped therearound at a relatively high pitch angle.

In a further embodiment, the helical cable can be made by using a fiber-in-metal-tube arrangement, that is then bent around the fiber core into a helical or other wound shape. Because a FIMT itself has some structural strength and is relatively stiff, in some embodiments using a FIMT that has been bent into a helical or other wound shape may be possible without a central cable core around which the fiber would be wound, as in the other embodiments. Hence, in some embodiments of the invention, using a FIMT as the fiber optical cable, and bending the FIMT into a helical or other wound (e.g. cycloidal) shape can provide advantages, in that then, in some embodiments, no cable core is required. Moreover, because the FIMT is itself already protected within a metal tube, where a FIMT has been bent into a wound shape for use as a wound fiber optic cable of the present invention, then no outer cladding layer may, in some embodiments, be necessary.

Regarding the outer wrapping that is applied to the cable, in some embodiments a frequency selective wrapping can be used for the cable, in that it is different at different points along the cable, or for different angles of helical or other wound wrapping. A different wrapping material for the cable can provide different frequency selection characteristics. Thus, for example, at some points of the cable a UPVC type wrapping may be used, whereas at other points of the cable, a rubberised cable wrapping may be applied. At yet further points a more acoustically conductive cable wrapping may be applied, for example a metal tube material or the like. The important point, however, is that a different cable wrapping material may be used as the outer layer of the cable at different points therealong, depending on the intended use, and that such different material may have different acoustic conduction properties i.e. be more or less acoustically conductive, and/or be frequency selective, depending on material selection and design.

Figure 28:
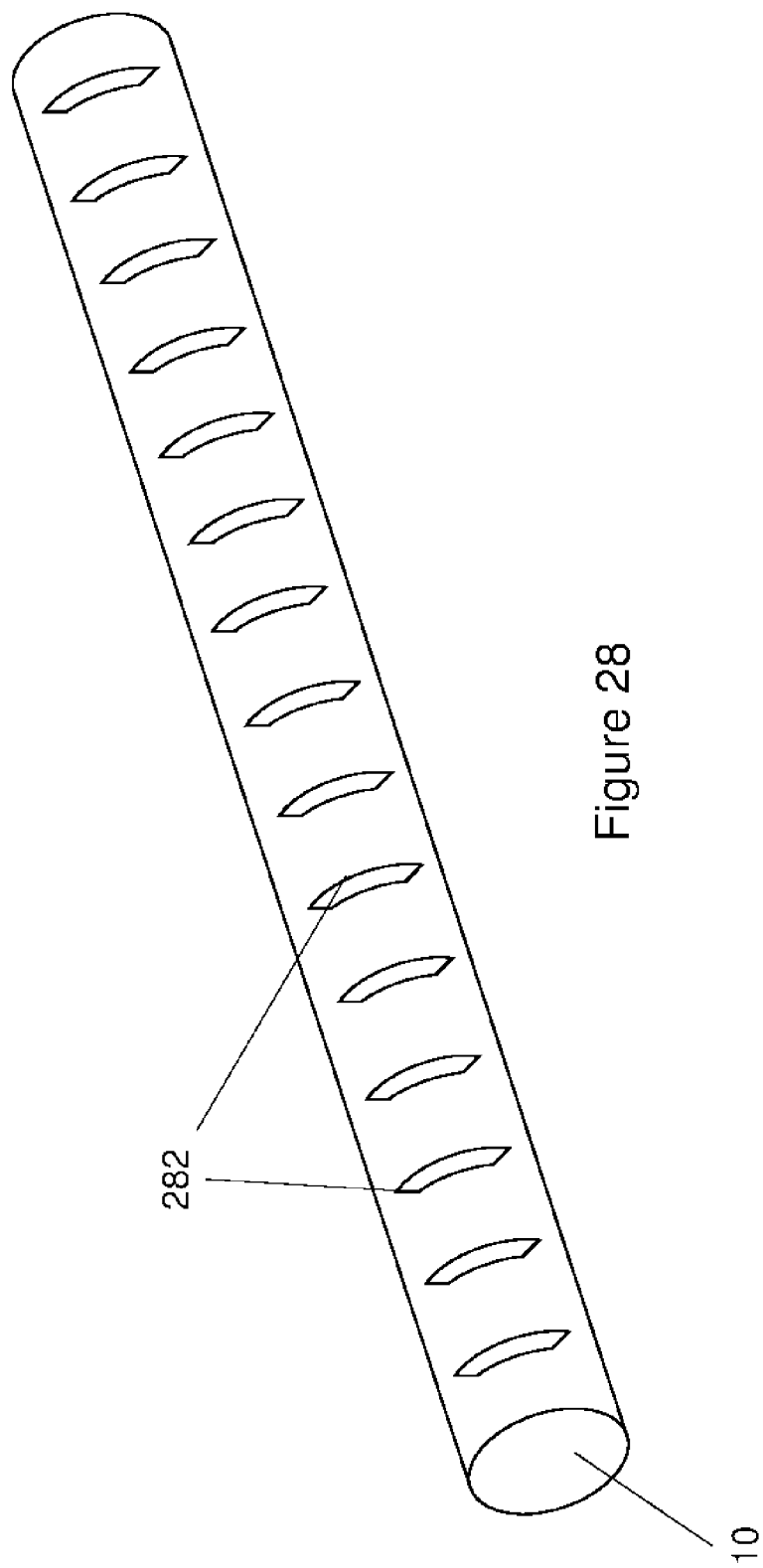
FIG. 28 is a diagram of a notched cable core to help retain fiber windings in place in accordance with one embodiment of the invention.

Regarding maintaining the helically wound fiber on the cable core, FIG. 28 illustrates a preferred arrangement that helps to solve the problem of fiber slippage. In this arrangement, a cable core 10 is provided with notches 282 provided therein, within which a helically or other spirally wound cable is intended to sit, and thereby be held in place. In further embodiments, other measures may be taken to try and keep the optical fiber in place on the cable core. For example, the cable core 10 may be provide with an adhesive surface on its outer layer, around which the optical fiber 12 is then wound, and adheres thereto. Moreover, combinations of the above solutions may be provided i.e. notches may be provided in the cable core 10 in combination with the use of adhesive layers, or the like. Where notches and/or adhesive are used, it should be understood that the position of the notches and/or adhesive may be controlled so as to precisely position the optical fiber in the desired helical or spirally wound patterns around the cable core 10, so that it becomes possible to very precisely design the helical or other wound wrapping around the cable core 10, at each point along the entire length of the cable. Using such techniques completely bespoke helical or spirally wound cables can be designed which provide for particular pitch and angle of helical or spiral wrap at precisely defined positions along the length of the cable, depending on the sensing application being used, and the particular installation against which the helical or spirally wound cable is to be installed.

FIG. 23 shows an alternative design of clamp that can be used with a helical or spirally wound cable according to embodiments of the invention. Here, a pipe 182 is provided with a helical or spiral cable 1, 2, 3, or 4 placed there against. In order to keep the helical or spiral cable in place, a pair of magnets 266 and 267 are placed either side of the cable, arranged such that opposite poles of the magnets are next to each other, and thereby attracted to each other with the helical cable 1, 2, 3, and 4 placed there between. The magnets therefore act to squeeze the cable laterally, in order to prevent lateral expansion of the cable. In this respect, the magnets are placed at opposite sides of the cable, which sides are orthogonal to the side of the cable that contacts the pipe 182 to be monitored. A metal band clamp or the like 202 is placed around the entire arrangement, in order to keep it in place, and attached to the pipe 182. Conveniently, in some embodiments the magnets can be provided on a strip of material, which strip is then placed over the cable 1, 2, 3, and 4, with the magnets of opposite poles on either side of the cable. Such arrangement allows for ease of installation.

The effect of such a clamp is that the magnets act to squeeze the cable in a lateral direction, so as to prevent expansion of the cable in a lateral direction, i.e. orthogonal to the direction of incidence of vibrations from the pipe that are to be detected. By constraining the ability of the cable to vibrate laterally in this manner, the cable is rendered more sensitive to incident acoustic vibrations coming from the pipe, as the cable can only effectively move in an up and down direction, orthogonal to the lateral squeezing direction applied by the two magnets. Such an arrangement therefore makes the helical cable 1, 2, 3, and 4 more sensitive to incident acoustic vibrations which arrive in a longitudinal direction from the pipe 182, orthogonal to the lateral squeezing direction applied to the cable by the magnets 266 and 267.

Within embodiments of the invention above, we often refer to a "helical" winding or "helically wound". In this respect, embodiments of the invention are not limited to mathematically precise definitions of a helix, and hence helical winding, which typically dictate that the winding proceed generally continuously in the linear direction of the helix without "doubling back" on itself at any point. In contrast, embodiments of the invention encompass any generally wound arrangement which progresses in a linear direction along a central winding axis, and includes cycloidal arrangements, as well as wound arrangements where the winding segments are angled such that effectively the linear position of the optical fiber along the central axis of the winding reciprocates back and forwards over one winding, whilst moving generally along the axis. Embodiments of the present invention are therefore intended to cover any generally wound arrangement of optical fiber, whether helical, spirally wound, cycloidally wound (or any derivative thereof, or any combination thereof.

Moreover, in embodiments of the invention described above, we usually describe a substantially circular cross-sectional core. However, embodiments of the invention are not limited to a circular cross-sectional core, and other shapes can be used. For example, as shown in FIGS. 29 and 30, the core may be of square or rectangular cross-section, as shown by core 10' in FIG. 29. In other embodiments, any other shape may be used, such as triangular, pentagonal, hexagonal, heptagonal, octagonal, etc, etc. Moreover, other more complicated shapes may be used as the core, for example, a horseshoe shape, or an arc, for example corresponding to part of a circle. In particular, the shape of the core may be made complementary to the shape of an article against which the cable is intended to sit against when in use, so as to increase the contact area between fiber wrapped around the core, and the article. For example, where the cable is intended for use against a pipe, the shape of the core may be made complementary to the external surface of the pipe, so as to increase the surface area of fiber which is in direct contact (through any outer sleeve) with the surface that is to be monitored. Specifically, the complementary shape may be the same shape as the external surface of the pipe or other article to be monitored, so that the cable fits substantially contiguously there against.

FIG. 30 illustrates an example cable core shape 10" in accordance with the above, and that is adapted to increase the surface area of wound fiber that is in direct contact with the external surface of a pipe of circular cross-section. In this respect, the cable core 10" is of a cross-section that is arc shaped, complementary to a segment of the circular pipe against which the cable is intended to lie. Such complementary shaped cables may be used with the clamps described previously with respect to FIGS. 23 and 20.

Figure 19:
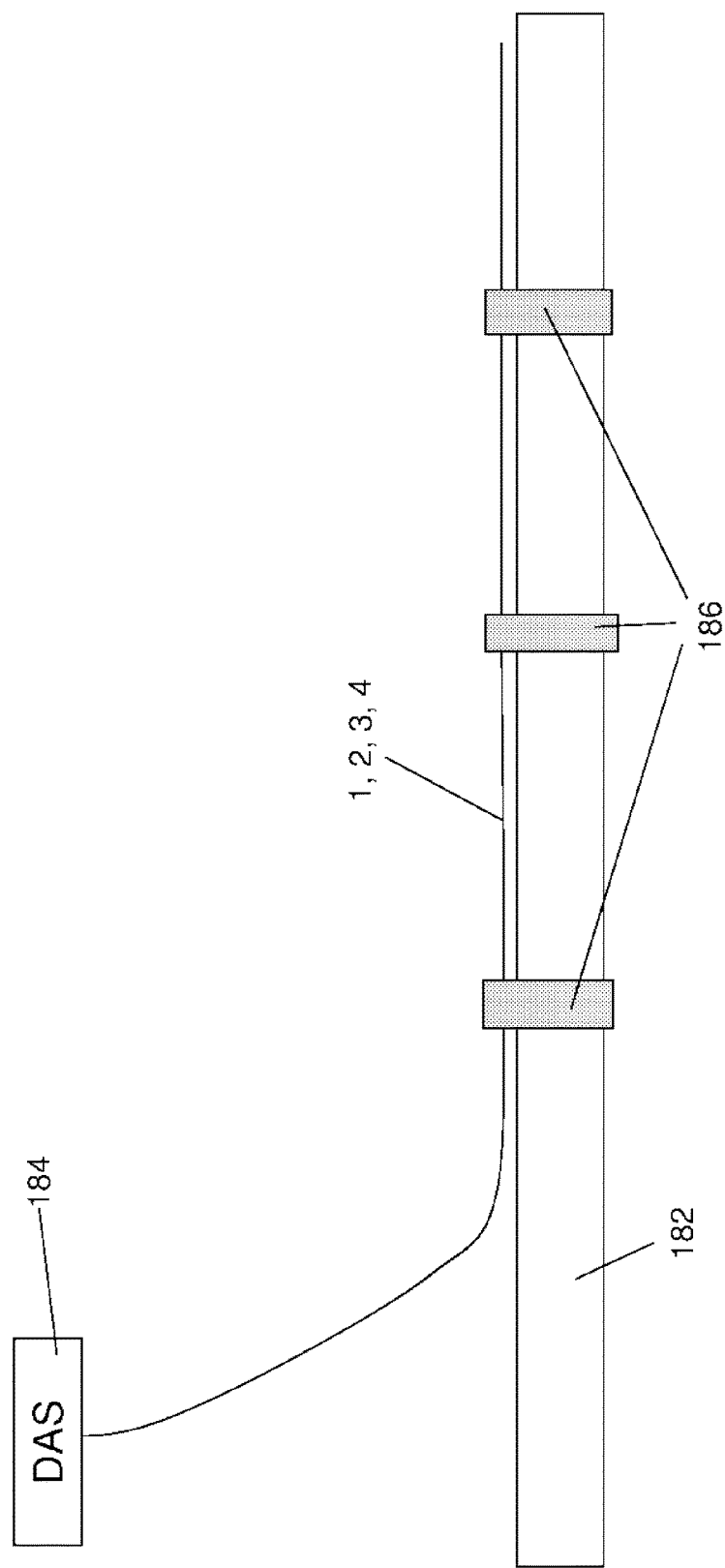
FIG. 19 is a system diagram of DAS system fitted with a cable according to embodiments of the invention, held in place on pipework by clamps in accordance with embodiments of the invention.

FIG. 19 is a diagram illustrating a whole DAS system provided with a cable according to any of the embodiments above, being used for flow monitoring of flow in pipe 182. In particular, DAS 184, which may be a Silixa iDAS or the like, as mentioned previously, is connected to optical fiber cable, which may be an optical fiber cable according to any of the previously described embodiments. The optical fiber cable is attached to the pipe 182 by clamps 186, which may be clamps in accordance with any of the previously described embodiments, and in particular may each extend to several pipe diameters in length. In one preferred embodiment, the optical fiber cable is arranged such that there are helical windings of low pitch (hence providing high spatial resolution) in the parts of the cable which are contained within the clamps, but that elsewhere within the cable the helical pitch of the fiber is either very high, or the fiber proceeds along the cable without being meaningfully helically wound there-around. In this way, the maximum length of sensor cable can be obtained, to provide maximum range for the sensor.

With such an arrangement the DAS is able to provide acoustic sensing information of very high spatial resolution in those areas of the pipe where there is good acoustic coupling due to the clamping. Moreover, the clamps themselves may extend over an extended length of 3 to 4 meters, which is the usually length over which eddies extend, and hence the arrangement is very good for flow monitoring purposes. In between the clamps the high helical pitch or lack of a helical winding means that bending losses in the fiber are minimised, and hence overall length of the cable, and range of the DAS system can be increased compared to the case where the cable is helically wound along its entire length.

Various modifications, whether by way of addition, substitution, or deletion of features may be made to the above described embodiments to provide further embodiments, any and all of which are intended to be encompassed by the appended claims.

What is claimed is:

1. An optical fiber cable for use in a distributed optical fiber sensing system, comprising an optical fiber wound on a cable core, the optical fiber comprising at least two sections of a first type connected by at least one section of a second type, wherein the first type comprises windings about the cable core so as to provide a sensing resolution in use that is relatively higher than a native resolution of the sensing system, and wherein the second type comprises no effective winding about the cable core so as to provide a sensing resolution in use that is substantially the same as the native resolution of the sensing system.

2. A cable according to claim 1, wherein a pitch of the windings is substantially constant along a length of the cable.

3. A cable according to claim 1, wherein a pitch of the windings is variable along a length of the cable.

4. A cable according to claim 3, wherein the cable comprises at least a first section of optical fiber windings and a second section of optical fiber windings, wherein the pitch of the optical fiber windings in the first section is higher than in the second section.

5. A cable according to claim 3, wherein the cable comprises at least a section of optical fiber windings wherein a helical pitch alters along the length of the section in a determinative manner.

6. A cable according to claim 5, wherein the determinative manner is in accordance with a mathematical function, preferably a monotonic function.

7. A cable according to claim 3, wherein the pitch of the winding is angled in a first direction in a first part of the cable, and is angled in a second, generally opposite, direction in at least a second part of the cable.

8. A cable according to claim 1, wherein the optical fiber is wound on the cable core at an angle of up to 60 degrees, or more preferable less than 45 degrees, or even more preferably around 30 degrees.

9. A cable according to claim 1, and further comprising a frequency selective wrapping at one or more parts of the cable.

10. A cable according to claim 1, wherein the optical fiber is a fiber-in-metal-tube (FIMT) arrangements, the FIMT being bent into a spirally wound shape.

11. A cable according to claim 10, wherein there is no cable core as the bent FIMT is able to retain its shape.

12. A cable according to claim 1, wherein the optical fiber is wound on the cable core:
i) helically,
ii) cycloidally, and/or
iii) in a general winding fashion.

13. A cable according to claim 1, wherein the cable core is solid along its length.

14. A cable according to claim 1, wherein the cable core has one or more hollow regions along its length.

15. A cable according to claim 14, wherein the hollow regions comprise one or more acoustically reactive masses, arranged to change the directional acoustic response of the cable core to incident acoustic energy.

16. A cable according to claim 15, wherein the masses are located in one or more notches formed in the cable core at the circumference thereof.

17. A cable according to claim 16, wherein there are plural notches circumferentially dispersed around the cable core.

18. A cable according to claim 15, wherein the acoustically reactive masses are resiliently mounted in the cable core.

19. A cable according to claim 15, wherein the acoustically reactive mass is a cross-member extending across the hollow region.

20. A cable according to claim 1, wherein the cable core has a cross section that is any one of:
  i) circular;
  ii) polygonal;
  iii) arc-shaped;
  iv) horse-shoe shaped; or
  v) complementarily shaped to the outer surface of an article against which the cable is to be placed in use.

* * * * *